(12) United States Patent
Cho

(10) Patent No.: US 12,501,327 B2
(45) Date of Patent: Dec. 16, 2025

(54) DEVICE AND METHOD FOR CELL MANAGEMENT IN RADIO ACCESS NETWORKS

(71) Applicant: Samsung Electronics Co., Ltd., Suwon-si (KR)

(72) Inventor: Minsung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 18/305,838

(22) Filed: Apr. 24, 2023

(65) Prior Publication Data

US 2023/0354120 A1    Nov. 2, 2023

Related U.S. Application Data

(63) Continuation of application No. PCT/KR2023/003980, filed on Mar. 24, 2023.

(30) Foreign Application Priority Data

Apr. 27, 2022  (KR) .................. 10-2022-0052427

(51) Int. Cl.
*H04W 36/00* (2009.01)
*H04W 36/30* (2009.01)
(Continued)

(52) U.S. Cl.
CPC . *H04W 36/00835* (2018.08); *H04W 36/0085* (2018.08); *H04W 36/30* (2013.01); *H04W 72/56* (2023.01); *H04W 76/19* (2018.02)

(58) Field of Classification Search
CPC .................. B64D 13/00; B64D 13/08; B64D 2013/0618; B64D 2013/0637;
(Continued)

(56) References Cited

U.S. PATENT DOCUMENTS 11,122,482 B2    9/2021  Zhang et al.
11,202,240 B2   12/2021  Raheem et al.
(Continued)

FOREIGN PATENT DOCUMENTS

EP    3 962 171 A1    3/2022
EP    4-044-703 A1    8/2022
(Continued)

OTHER PUBLICATIONS

International Search Report and Written Opinion dated Jul. 7, 2023, issued in International Patent Application No. PCT/KR2023/003980.
(Continued)

*Primary Examiner* — Kashif Siddiqui
(74) *Attorney, Agent, or Firm* — Jefferson IP Law, LLP

(57) ABSTRACT

A radio access network (RAN) controller is provided. The RAN controller includes at least one transceiver and at least one processor operably coupled to the at least one transceiver. The at least one processor is configured to obtain measurement reports of a plurality of user equipment (UE)s. Each measurement report includes a measurement result per cell of a corresponding UE. The at least one processor is configured to identify candidate cells of a UE among the plurality of UEs, based on the measurement reports. The at least one processor is configured to transmit, to a serving base station for the UE, a control message including identification information for indicating the UE and identification information for indicating the candidate cells of the UE. The control message indicates a handover priority of each cell of the candidate cells. The candidate cells comprise a first cell for access and a second cell for access to be performed in response to a failure of the access to the first cell.

20 Claims, 24 Drawing Sheets

(51) Int. Cl.
*H04W 72/56* (2023.01)
*H04W 76/19* (2018.01)

(58) Field of Classification Search
CPC ... B64D 2013/0662; B64D 2013/0688; H04W 36/00; H04W 36/00835; H04W 36/0085; H04W 36/08; H04W 36/16; H04W 36/30; H04W 36/38; H04W 72/56; H04W 76/19; G06N 20/00; Y02T 50/50
See application file for complete search history.

(56) References Cited

U.S. PATENT DOCUMENTS

| | | | | |
|---|---|---|---|---|
| 2012/0208539 | A1* | 8/2012 | Alonso-Rubio | H04W 36/08 |
| | | | | 455/436 |
| 2013/0059587 | A1* | 3/2013 | Lindoff | H04W 36/0072 |
| | | | | 455/436 |
| 2013/0183970 | A1* | 7/2013 | Chen | H04W 36/302 |
| | | | | 455/436 |
| 2016/0029431 | A1 | 1/2016 | Shimizu et al. | |
| 2016/0127964 | A1 | 5/2016 | Roeland et al. | |
| 2019/0174362 | A1 | 6/2019 | Yang et al. | |
| 2020/0314719 | A1 | 10/2020 | Tofighbakhsh et al. | |
| 2021/0368405 | A1 | 11/2021 | Mishra et al. | |
| 2022/0078684 | A1* | 3/2022 | Fehrenbach | H04W 36/362 |
| 2022/0279498 | A1 | 9/2022 | Song et al. | |
| 2022/0330070 | A1 | 10/2022 | Song et al. | |
| 2023/0262572 | A1* | 8/2023 | Wu | H04W 36/0079 |
| | | | | 370/331 |

FOREIGN PATENT DOCUMENTS

| | | |
|---|---|---|
| KR | 10-2021-0003050 A | 1/2021 |
| KR | 10-2021-0043474 A | 4/2021 |
| KR | 10-2021-0094282 A | 7/2021 |
| KR | 10-2021-0125883 A | 10/2021 |
| WO | 2021/010693 A1 | 1/2021 |
| WO | 2021/101355 A1 | 5/2021 |
| WO | 2021/125846 A1 | 6/2021 |

OTHER PUBLICATIONS

Michele Polese et al., Understanding O-RAN: Architecture, Interfaces, Algorithms, Security, and Research Challenges, Arxiv.Org, Cornell University Library, XP091149164, Feb. 2, 2022.
Coronado Estefania et al., Roadrunner: O-RAN-based Cell Selection in Beyond 5G Networks, XP034133227, Noms 2022-2022 IEEE/Ifip Network Operations and Management Symposium, IEEE, Apr. 25, 2022.
Qualcomm Incorporated, Lte Conditional HO design considerations, R2-1904662, 3GPP Tsg-Ran WG2 Meeting #105bis, XP051701948, Xian, China, Apr. 6, 2019.
European Search Report dated Jun. 23, 2025, issued in European Application No. 23796625.4.

* cited by examiner

DEVICE AND METHOD FOR CELL MANAGEMENT IN RADIO ACCESS NETWORKS

CROSS-REFERENCE TO RELATED APPLICATION(S)

This application is a continuation application, claiming priority under § 365(c), of an International application No. PCT/KR2023/003980, filed on Mar. 24, 2023, which is based on and claims the benefit of a Korean patent application number 10-2022-0052427, filed on Apr. 27, 2022, in the Korean Intellectual Property Office, the disclosure of which is incorporated by reference herein in its entirety.

BACKGROUND

1. Technical Field

The disclosure relates to a radio access network (RAN). More particularly, the disclosure relates to a device and a method for cell management in the radio access network.

2. Description of Related Art

In order to meet the demand for wireless data traffic, high data transmission rate services are provided to users through fifth generation (5G) systems such as fourth generation (4G) with the commercialization of 5G systems and new radio (NR), and it is also expected that wireless communication services with various purposes, such as Internet of Things (IoT) and services requiring high reliability for specific purposes will be provided. Meanwhile, in order to efficiently manage cells and terminals in a radio access network (RAN) environment, a technology for controlling a plurality of cells is required.

The above information is presented as background information only to assist with an understanding of the disclosure. No determination has been made, and no assertion is made, as to whether any of the above might be applicable as prior art with regard to the disclosure.

SUMMARY

According to embodiments, a method performed by a radio access network (RAN) controller connected to base stations is provided. The method includes obtaining measurement reports of a plurality of user equipment (UE)s. Each measurement report of the measurement reports includes a measurement result per cell of a corresponding UE. The method includes identifying candidate cells of a UE among the plurality of UEs, based on the measurement reports. The method include transmitting, to a serving base station for the UE, a control message including identification information for indicating the UE and identification information for indicating the candidate cells of the UE. The control message may indicate a handover priority of each cell of the candidate cells. The candidate cells comprise a first cell for access and a second cell for access to be performed in response to a failure of the access to the first cell.

According to embodiments, a method performed by a base station is provided. The method includes receiving at least one measurement report from at least one user equipment (UE). Each measurement report of the at least one measurement report includes a measurement result per cell of a corresponding UE. The method includes transmitting, to a radio access network (RAN) controller, a report message including the at least one measurement report. The method includes receiving, from the RAN controller, a control message including identification information for indicating a UE and identification information for indicating candidate cells of the UE. The method includes transmitting, to the UE, a handover command. The control message may indicate a handover priority of each cell of the candidate cells. The candidate cells comprise a first cell for access and a second cell for access to be performed in response to a failure of the access to the first cell.

According to embodiments, a radio access network (RAN) controller connected to base stations is provided. The RAN controller includes at least one transceiver and at least one processor operably coupled to the at least one transceiver. The at least one processor may be configured to obtain measurement reports of a plurality of user equipment (UE)s. Each measurement report of the measurement reports includes a measurement result per cell of a corresponding UE. The at least one processor may be configured to identify candidate cells of a UE among the plurality of UEs, based on the measurement reports. The at least one processor may be configured to transmit, to a serving base station for the UE, a control message including identification information for indicating the UE and identification information for indicating the candidate cells of the UE. The control message may indicate a handover priority of each cell of the candidate cells. The candidate cells comprise a first cell for access and a second cell for access to be performed in response to a failure of the access to the first cell.

According to embodiments, a device of a base station is provided. The device includes at least one transceiver and at least one processor operably coupled to the at least one transceiver. The at least one processor may be configured to receive at least one measurement report from at least one user equipment (UE). Each measurement report of the at least one measurement report including a measurement result per cell of a corresponding UE. The at least one processor may be configured to transmit, to a radio access network (RAN) controller, a report message including the at least one measurement report. The at least one processor may be configured to receive, from the RAN controller, a control message including identification information for indicating a UE and identification information for indicating candidate cells of the UE. The at least one processor may be configured to transmit, to the UE, a handover command. The control message may indicate a handover priority of each cell of the candidate cells. The candidate cells comprise a first cell for access and a second cell for access to be performed in response to a failure of the access to the first cell.

BRIEF DESCRIPTION OF THE DRAWINGS

The above and other aspects, features, and advantages of certain embodiments of the disclosure will be more apparent from the following description taken in conjunction with the accompanying drawings, in which.

MODE FOR INVENTION

Figure 1:
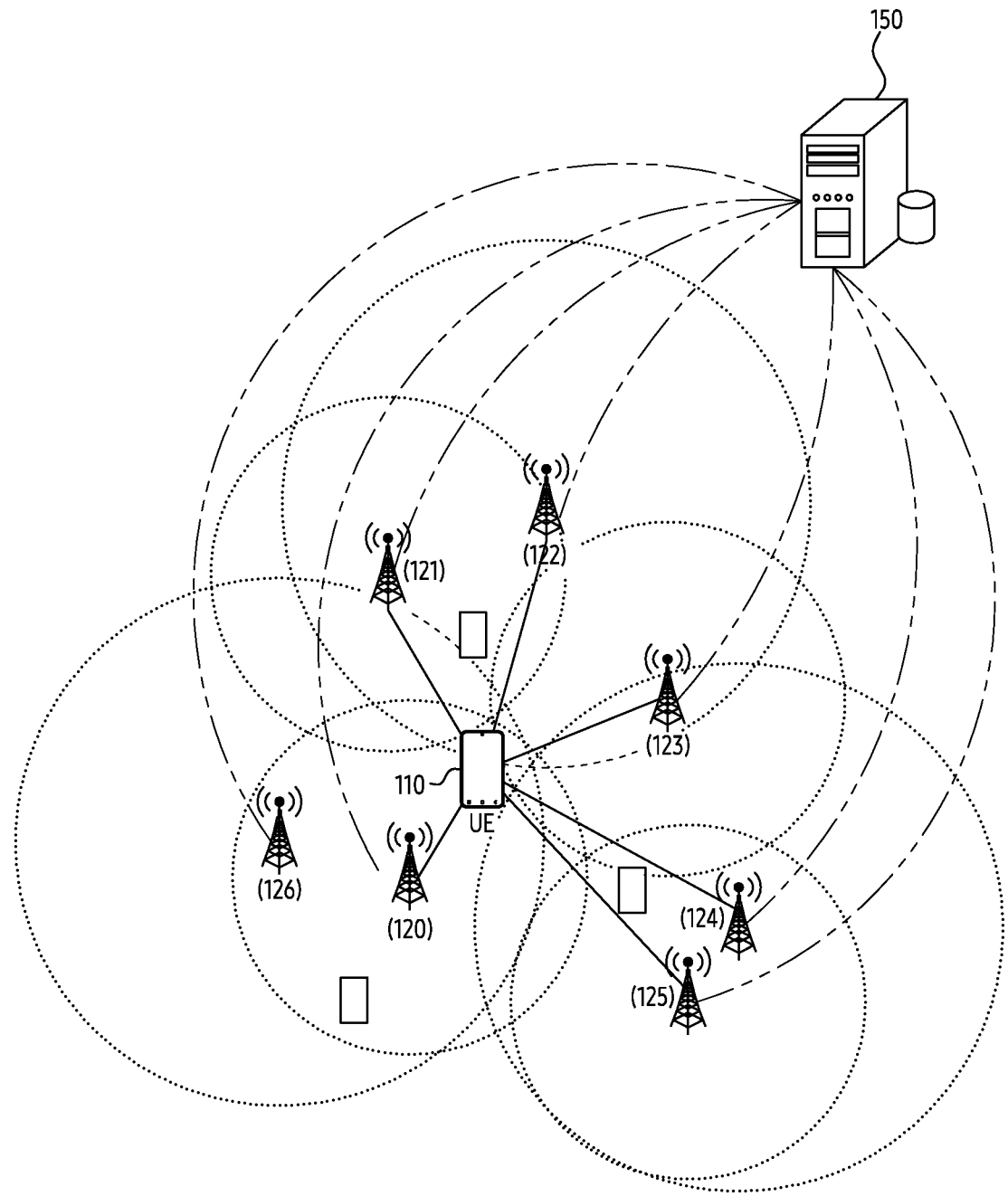
FIG. 1 illustrates an example of a wireless communication environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the disclosure described below, a hardware approach method will be described as an example. However, since various embodiments of the disclosure include technology that uses both hardware and software, various embodiments of the disclosure do not exclude a software-based approach.

Terms referring to signals (e.g., signal, information, message, signaling), terms referring to resources (e.g., symbol, slot, subframe, radio frame, subcarrier, resource elements (RE), resource block (RB), bandwidth part (BWP), occasion), terms for calculation state (e.g., step, operation, procedure), terms referring to data (e.g., packet, user stream, information, bit, symbol, codeword), terms referring to channels, terms referring to network entities, terms referring to components of a device, and the like used in the following description are illustrated for convenience of explanation. Therefore, the disclosure is not limited to the terms to be described below, and other terms having an equivalent technical meaning may be used.

In addition, in the disclosure, expressions 'greater than' or 'less than' may be used to determine whether a specific condition is satisfied or fulfilled, but this is only a description for expressing an example and does not exclude the description 'greater than or equal to' or 'less than or equal to'. Conditions described as 'greater than or equal to' may be replaced with 'greater than', conditions described as 'less than or equal to' may be replaced with 'less than', and conditions described as 'greater than or equal to and less than' may be replaced with 'greater than and less than or equal to'.

In addition, the disclosure describes various embodiments using terms used in some communication standards (e.g., 3rd Generation Partnership Project (3GPP), extensible radio access network (xRAN), open-radio access network (O-RAN), but this is only an example for explanation. Various embodiments of the disclosure may be easily modified and applied in other communication systems.

In the disclosure, the measurement signal may refer to a signal measured by a terminal to obtain signal quality to be used for mobility, admission control, or radio resource management (RRM). For example, the measurement signal may be at least one of a synchronization signal (SS) (e.g., SS block), a beam reference signal (BRS), a beam refinement reference signal (BRRS), a cell-specific reference signal (CRS), a channel state information-reference signal (CSI-RS), or a demodulation-reference signal (DM-RS). According to embodiments, a base station may transmit not only one type of measurement signal but also measurement signal of each of two or more types.

For example, in the disclosure, the signal quality may be at least one of reference signal received power (RSRP), beam reference signal received power (BRSRP), reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), or block error rate (BLER). In addition to the above-described examples, other terms having the same technical meaning or other metrics indicating channel quality may be used. Hereinafter, the high signal quality in the disclosure means a case in which a signal quality value related to a signal size is large or a signal quality value related to an error rate is small. Higher signal quality may mean that a smoother wireless communication environment is guaranteed. In addition, an optimal beam may mean a beam having the highest signal quality among the beams.

Hereinafter, the disclosure relates to a control procedure between device in a radio access network (RAN) and device controlling the RAN in a wireless communication system. Specifically, the disclosure provides a method for increasing operational stability of an entire wireless network by matching cells suitable for the terminal through a RAN controller connected to multiple RANs. In addition, the disclosure provides a method for reducing an overhead of network access by providing a quick handover command to the UE according to the channel state.

FIG. 1 illustrates an example of a wireless communication environment. FIG. 1 illustrates a terminal and a base station as part of nodes using a wireless channel in a wireless communication system according to an embodiment of the disclosure.

Referring to FIG. 1, the wireless communication environment may include a terminal 110, a first base station 120, a second base station 121, a third base station 122, a fourth base station 123, a fifth base station 124, a sixth base station 125, and a seventh base station 126.

The terminal 110 is a device used by a user and may perform communication with a base station (e.g., the first base station 120, the second base station 121, the third base station 122, the fourth base station 123, the fifth base station 124, the sixth base station 125, and the seventh base station 126) through a wireless channel. The terminal 110 may communicate with the first base station 120 when accessing the wireless network provided by the first base station 120. The terminal 110 may communicate with the second base station 121 when accessing the wireless network provided by the second base station 121. The terminal 110 may communicate with the third base station 122 when accessing the wireless network provided by the third base station 122. The terminal 110 may communicate with the fourth base station 123 when accessing the wireless network provided by the fourth base station 123. The terminal 110 may communicate with the fifth base station 124 when accessing the wireless network provided by the fifth base station 124. The terminal 110 may communicate with the sixth base station 125 when accessing the wireless network provided by the sixth base station 125. The terminal 110 may communicate with the seventh base station 126 when accessing the wireless network provided by the seventh base station 126.

According to an embodiment, the terminal 110 may be operated without user involvement. The terminal 110 is a device that performs machine type communication (MTC), and may not be carried by a user. The terminal 110 may refer to 'user equipment (UE)', 'mobile station', 'subscriber station', 'customer-premises equipment (CPE)', 'remote terminal', 'wireless terminal', 'user device', or other terms having an equivalent technical meaning in addition to a terminal.

The first base station 120, the second base station 121, the third base station 122, the fourth base station 123, the fifth base station 124, the sixth base station 125, and the seventh base station 126 are network infrastructure that provides wireless access. The base station 110 has coverage defined as a certain geographic area based on a distance at which a signal may be transmitted. The base station 126 may be referred to as 'access point (AP),' 'eNodeB (eNB),' '5th generation node', 'next generation nodeB (gNB)', 'wireless point', 'transmission/reception point (TRP)', or other terms having an equivalent technical meaning in addition to a base station.

A RAN controller 150 may be a device for controlling RAN elements and resources through data collection and operations. According to an embodiment, the RAN controller 150 may function as an a Near-RT RIC of an O-RAN standard. According to another embodiment, the RAN controller 150 may function as a Non-RT RIC of the O-RAN standard. According to still another embodiment, the RAN controller 150 may be a separate device for functioning as both non-RT RIC and Near-RT RIC of the O-RAN standard. According to still another embodiment, the RAN controller may be a device for receiving a report message defined separately from the O-RAN standard from each base station and transmitting a control message to each base station.

The RAN controller 150 may be connected to the first base station 120, the second base station 121, the third base station 122, the fourth base station 123, the fifth base station 124, the sixth base station 125, and the seventh base station 126. Hereinafter, the operation of the base stations are described based on the first base station 120, but the description of the first base station 120 may be applied to other base stations (e.g., the second base station 121, the third base station 122, the fourth base station 123, the fifth base station 124, the sixth base station 125, and the seventh base station 126) in the same or similar manner.

The RAN controller 150 may receive network information of the first base station 120 from the first base station 120. The network information may refer to information related to a radio access network (RAN) provided by the first base station 120. According to an embodiment, the network information of the first base station 120 may include information on one or more cells provided by the first base station 120. In addition, according to an embodiment, the network information of the first base station 120 may include information on one or more terminals served by the first base station 120. In addition, according to an embodiment, the network information of the first base station 120 may include a measurement report of each of one or more terminals served by the first base station 120. The first base station 120 may collect measurement reports received from each terminal. In addition, according to an embodiment, the network information of the first base station 120 may include a measurement configuration of each cell provided by the first base station 120. The measurement configuration may include at least one parameter related to an event for determining triggering of the measurement report. In addition, according to an embodiment, the network information of the first base station 120 may include channel information of a terminal serviced by the first base station 120. In addition, according to an embodiment, the network information of the first base station 120 may include resource usage information allocated by the first base station 120.

A cell may refer to an area that may be covered by one base station. One base station may cover one cell or multiple cells. The multiple cells may be distinguished by frequency to be supported and a sector to be covered. In the following description, the base station may be used as a term including a cell, or the cell may be used as a term referring to a base station.

A serving cell is a cell that provides a terminal and a higher layer signaling (e.g., radio resource control (RRC) signaling), and may be a single cell or multiple cells. In case that the terminal is not configured to support carrier aggregation (CA) and dual connectivity (DC), the serving cell may be one cell including a main cell. In case that the terminal is configured to support the CA or the terminal, the serving cell may be a set of one or more cells including both a main cell and at least one sub-cell.

Dual/multi-connectivity technology is a technology that increases frequency utilization efficiency from a terminal or base station perspective by transmitting and receiving signals by simultaneously using carriers in a plurality of base stations located in different frequency bands with connecting one terminal to a plurality of different base stations. The terminal may be simultaneously connected to a first base station (e.g., the base station providing a service by using LTE technology or 4th generation mobile communication technology) and a second base station (e.g., the base stations providing a service by using NR (new radio) technology or 5G (5th generation) mobile communication technology) to transmit and receive traffic. In this case, a frequency resource used by each base station may be located in different bands. As described above, a method of operating based on the dual connection method between LTE and NR may be referred to as a 5G non-standalone (NSA).

Figure 2A:
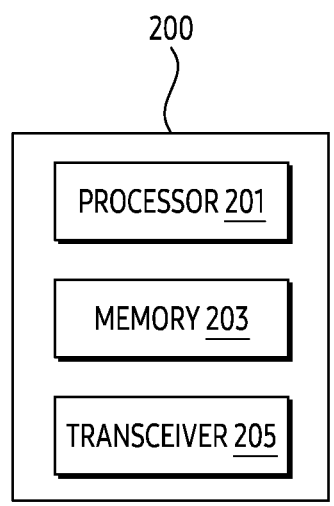
FIG. 2A illustrates a functional configuration of a base station according to an embodiment of the disclosure.

FIG. 2A illustrates a functional configuration of a base station 200 according to an embodiment of the disclosure. The base station 200 illustrated in FIG. 2A may be understood as a configuration of the first base station 120. The terms ' . . . unit' and ' . . . er' used hereinafter refer to a unit that processes at least one function or operation, which may be implemented by hardware or software, or a combination of hardware and software.

Referring to FIG. 2A, the base station 200 may include a processor 201, a memory 203, and a transceiver 205.

The processor 201 controls overall operations of the base station 200. For example, the processor 210 writes and reads data in the memory 203. For example, the processor 210 transmits and receives a signal through the transceiver 205. Although one processor is illustrated in FIG. 2A, embodiments of the disclosure are not limited thereto. The base station 200 may include at least one processor to perform embodiments of the disclosure. The processor 201 may be referred to as a control unit or a control means. According to embodiments, the processor 201 may control the device to perform operations of the base station 200 according to embodiments of the disclosure.

The memory 203 may store data such as a basic program, an application program, and configuration information for the operation of the base station 200. The memory 203 may be configured as a volatile memory, a nonvolatile memory, or a combination of the volatile memory and the nonvolatile memory. In addition, the memory 203 may provide stored data based on the request of the processor 210.

The transceiver 205 performs functions for transmitting and receiving a signal through a wireless channel. For example, the transceiver 205 performs a conversion function between a baseband signal and a bit string according to a physical layer standard of the system. For example, when data is transmitted, the transceiver 205 generates complex symbols by encoding and modulating a transmission bit string. In addition, when data is received, the transceiver 205 may restore the received bit string through demodulation and decoding of the baseband signal. In addition, the transceiver 205 may upconvert the baseband signal into an RF (radio frequency) band signal and transmits it through an antenna, and may downconvert the RF band signal received through the antenna into a baseband signal.

To this end, the transceiver 205 may include a transmission filter, a reception filter, an amplifier, a mixer, an oscillator, a digital to analog converter (DAC), an analog to digital converter (ADC), and the like. In addition, the transceiver 205 may include multiple transmission/reception paths. Furthermore, the transceiver 205 may include at least one antenna array composed of multiple antenna elements. In terms of hardware, the transceiver 205 may be composed of a digital unit and an analog unit, and the analog unit may be composed of multiple sub-units according to operating power, operating frequency, and the like.

The transceiver 205 may transmit and receive signals as described above. Accordingly, the transceiver 205 may be referred to as a 'transmitter', a 'receiver', or a 'transmitting/receiving unit'. In addition, in the following description, transmission and reception performed through a wireless channel, a backhaul network, an optical cable, Ethernet, and other wired paths is used as a meaning including processing performed by the transceiver 205 as described above. According to an embodiment, the transceiver 205 may provide an interface for performing communication with other nodes in the network. In other words, for example, the transceiver 205 may convert a bit string transmitted from the base station 200 to another node, another access node, another base station, an upper node, a core network, and the like into a physical signal, and convert the physical signal received from another node into a bit string.

Figure 2B:
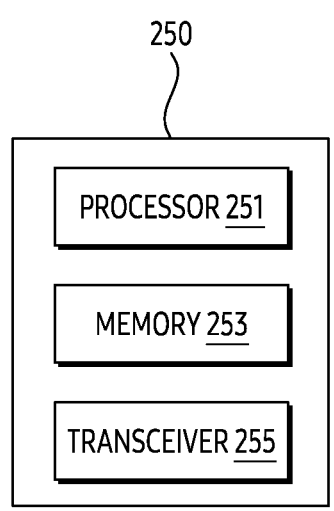
FIG. 2B illustrates a functional configuration of a radio access network (RAN) controller according to an embodiment of the disclosure.

FIG. 2B illustrates a functional configuration of a radio access network (RAN) controller 250 according to an embodiment of the disclosure. The terms ' . . . unit' and ' . . . er' used hereinafter refer to a unit that processes at least one function or operation, which may be implemented by hardware or software, or a combination of hardware and software.

Referring to FIG. 2B, the RAN controller 250 may include a processor 251, a memory 253, and a transceiver 255.

The processor 251 controls overall operations of the RAN controller 250. For example, the processor 251 writes and reads data in the memory 253. Also, the processor 251 transmits and receives a signal through the transceiver 255. Although one processor is illustrated in FIG. 2B, embodiments of the disclosure are not limited thereto. The RAN controller 250 may include at least one processor to perform embodiments of the disclosure. The processor 251 may be referred to as a control unit or a control means. According to embodiments, the processor 251 may control the device to perform operations of the RAN controller according to embodiments of the disclosure.

The memory 253 may store data such as a basic program, an application program, and configuration information for the operation of the core network device. The memory 253 may be formed of a volatile memory, a nonvolatile memory, or a combination of the volatile memory and the nonvolatile memory. In addition, the memory 253 may provide stored data according to the request of the processor 251.

The transceiver 255 may provide an interface for performing communication with other devices in the network. In other words, the transceiver 255 may convert a bit string transmitted from the core network device to another device into a physical signal and converts the physical signal received from another device into a bit string. In other words, the transceiver 255 may transmit and receive a signal. Accordingly, the transceiver 255 may be referred to as a modem, a transmitter, a receiver, or a 'transmitting/receiving unit'. In this case, the transceiver 255 may enable the RAN controller 250 to communicate with other devices or systems over a backhaul connection (e.g., wired backhaul or wireless backhaul) or over a network.

Figure 3A:
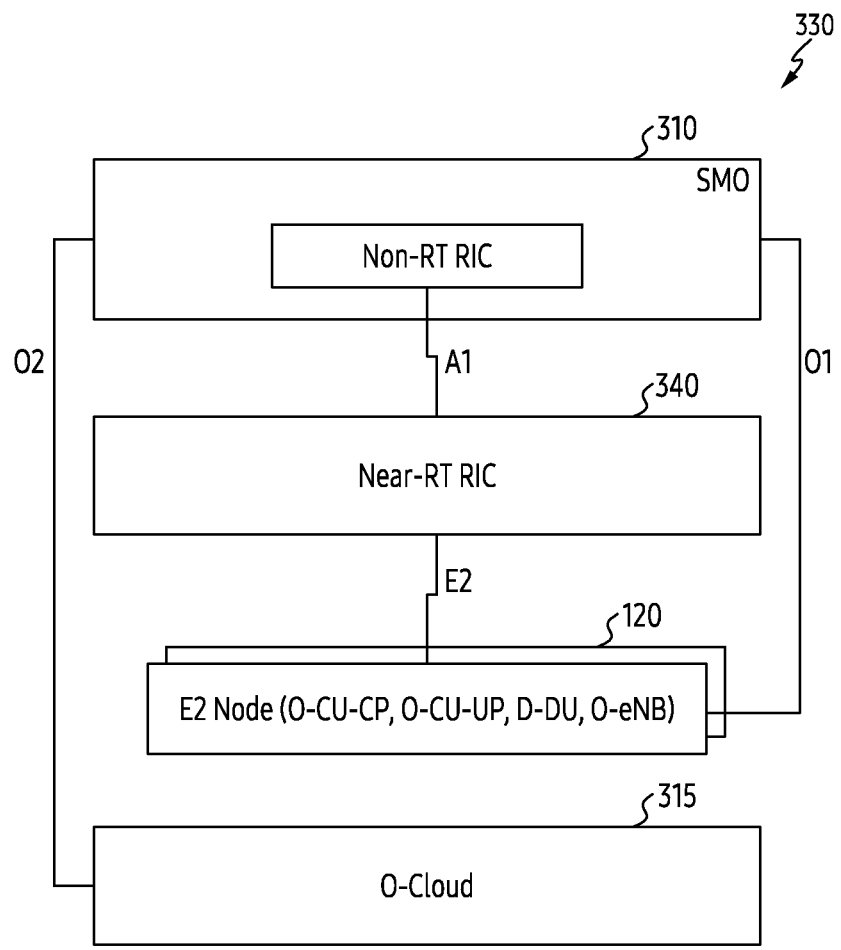
FIG. 3A illustrates an example of a RAN controller in an Open-RAN (O-RAN) environment according to an embodiment of the disclosure.

FIG. 3A illustrates an example 330 of a RAN controller in an Open-RAN (O-RAN) environment according to an embodiment of the disclosure. In FIG. 3A, a logical architecture of an O-RAN is illustrated. According to an embodiment, the RAN controller may correspond to a non-RT RIC of an O-RAN standard.

Referring to FIG. 3A, a service management and orchestration (SMO) framework may be connected to O-RAN NF (Network function) and O-Cloud 315 through a main interface used in O-RAN, such as the A1 interface, the O1 interface, and the O2 interface. According to an embodiment, the O-RAN NF may be a virtualized network function (VNF) on the O-Cloud 315. In addition, according to an embodiment, the O-RAN NF may be in the form of a containerized network function (CNF). In addition, according to an embodiment, the O-RAN NF may be a physical network function (PNF) that utilizes customized hardware.

The SMO 310 is responsible for the RAN domain management and orchestration functions. The main function of the SMO 310 to provide RAN support in the O-RAN includes the FCAPS (Fault, Configuration, Alarms, Performance and Security) interface to the O-RAN NF, Non-Real Time RAN Intelligent Controller (RIC) framework for RAN optimization, O-Cloud management, orchestration, and workflow management function.

The Non-RT RIC is an internal function of the SMO 310 in the O-RAN architecture that provides an A1 interface to the Near-Real Time RAN Intelligent Controller (Near-RT RIC) 340. The main purpose of the non-RT RIC is to support intelligent RAN optimization by providing policy-based guidance, ML model management, and enrichment information to Near-RT RIC so that the RAN may optimize radio resource management (RRM) under a specific condition. The non-RT RIC may perform the RAN optimization operation at non-real-time (over 1 second) intervals by using data analysis, AI (Artificial Intelligence)/ML (machine learning) training and inference.

Figure 3B:
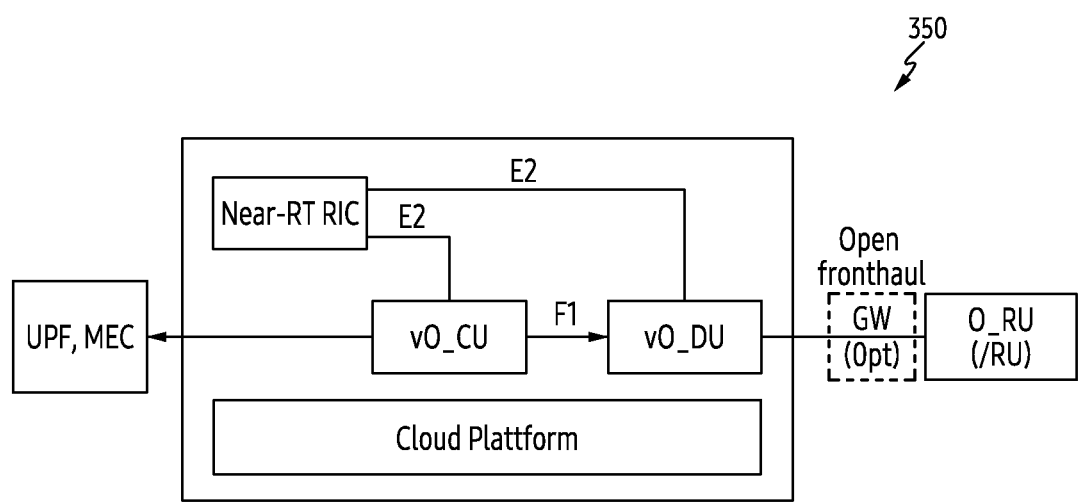
FIG. 3B illustrates an example of a RAN controller in a cloud platform according to an embodiment of the disclosure.

FIG. 3B illustrates an example 350 of a RAN controller in a cloud platform according to an embodiment of the disclosure. The RAN controller may be an O-RAN standard near-RT RIC. In FIG. 3B, an implementation example of an E2 node and an RIC of an O-RAN is described.

Referring to FIG. 3B, the E2 node (e.g., O-DU, O-CU) and the RIC may be virtualized on a cloud platform (e.g., open chassis and blade specification edge clouds) and configured on a device (e.g., server). Virtualization of the E2 node and the RIC may support a service in dense urban areas due to low latency enough to meet O-DU latency requirements and abundant fronthaul capacity to allow baseband unit (BBU) function to be pooled to a central location. Because there is no need to attempt centralization of near-real-time RIC beyond the limit, the cloud platform may be optimized for O-RAN deployment scenarios where Near-RT RIC, O-CU and O-DU are implemented.

Figure 4:
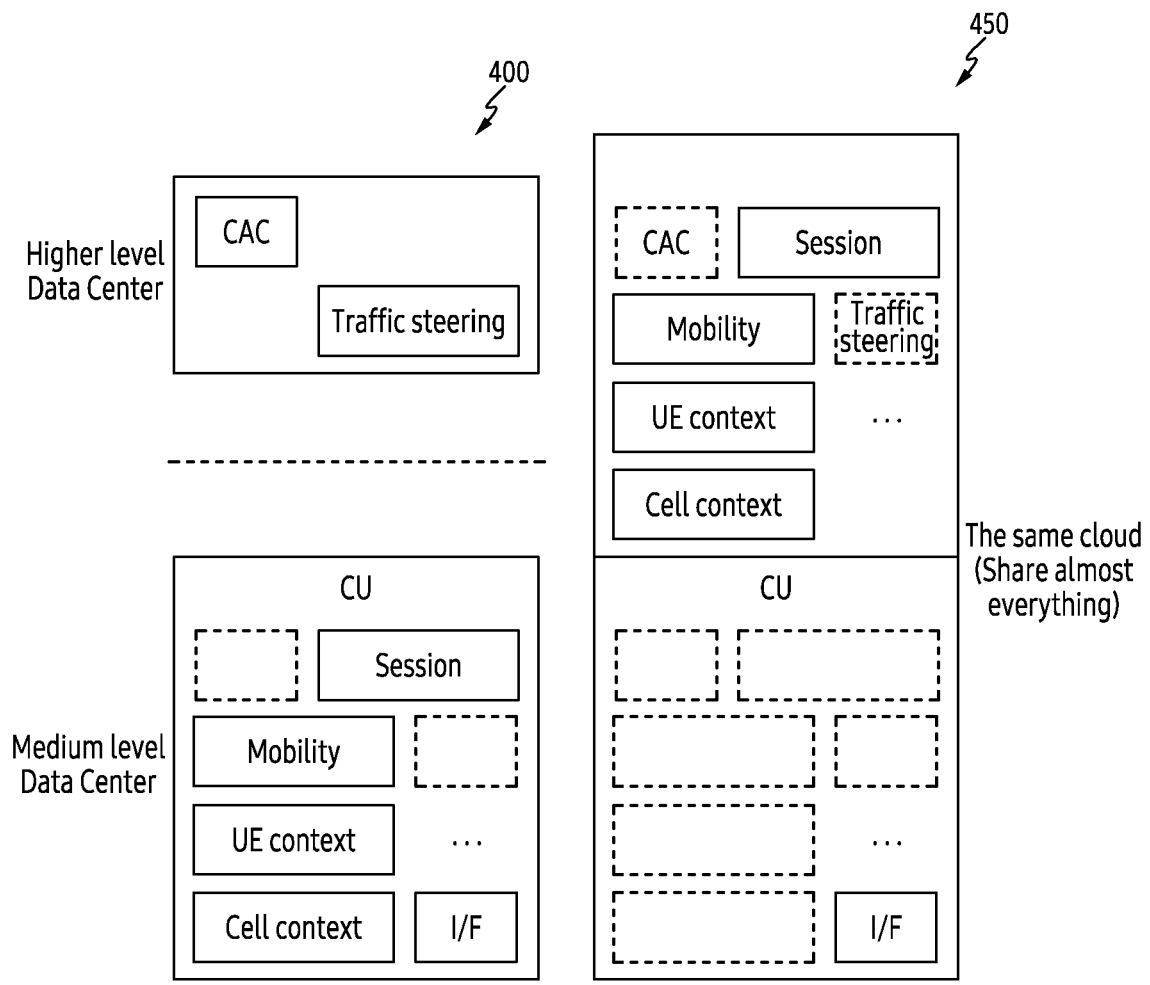
FIG. 4 illustrates examples of deployment scenarios of a RAN controller according to an embodiment of the disclosure.

FIG. 4 illustrates examples of deployment scenarios of a RAN controller according to an embodiment of the disclosure. FIG. 4 illustrates examples of functional separation of the RAN controller and a centralized unit (CU) according to embodiments.

Referring to FIG. 4, in deployment scenario #1 400, the RAN controller may be located at a separate site or may be configured in the form of another NE. According to an embodiment, the RAN controller may be configured to perform at least part function of the CU (e.g., call admission control and traffic steering) instead. In deployment scenario #2 450, the RAN controller may be implemented with the CU in one device. According to an embodiment, the RAN controller may replace almost all functions of the CU except for 3GPP I/F management. The RAN controller may be located in a separate site or may be configured in the form of another NE.

Although two scenarios are illustrated in FIG. 4, other scenarios may be applied. For example, in deployment scenario #1 400, the mobility function may be performed by the RAN controller rather than the CU. In addition, as an example, in deployment scenario #1 400, the UE context function may be performed by the RAN controller rather than the CU. In addition, for example, in deployment scenario #1 400, the session configuration function may be performed by the RAN controller rather than the CU.

Embodiments of the disclosure may provide a device and a method for matching a cell applicable to a specific terminal within multiple radio networks through the RAN controller. An applicable cell means a cell providing a radio access network for providing a service to a specific terminal. According to an embodiment, the cell applicable for a specific terminal may include a candidate cell. The candidate cell may mean a cell identified as providing a service to a specific terminal by the determination of the RAN controller among a serving cell and neighboring cells of the terminal. The RAN controller may determine that it is most reasonable that the candidate cell provides a service to the terminal, based on the collected information. In addition, according to an embodiment, the cell applicable for a specific terminal may include a measurement cell. The measurement cell may mean a cell indicated by a measurement report. The serving base station may configure the terminal to perform handover based on the measurement report, separately from the determination of the RAN controller. In case that the terminal is not connected to an applicable cell, the serving base station may transmit a handover command to the terminal so that the terminal is connected to the preferred cell.

In embodiments of the disclosure, a measurement result procedure of LTE standard or NR standard may be used to match the applicable cell to the terminal. Hereinafter, messages and parameters related to measurement report defined in 3GPP standards are described in FIGS. 5A and 5B.

Figure 5A:
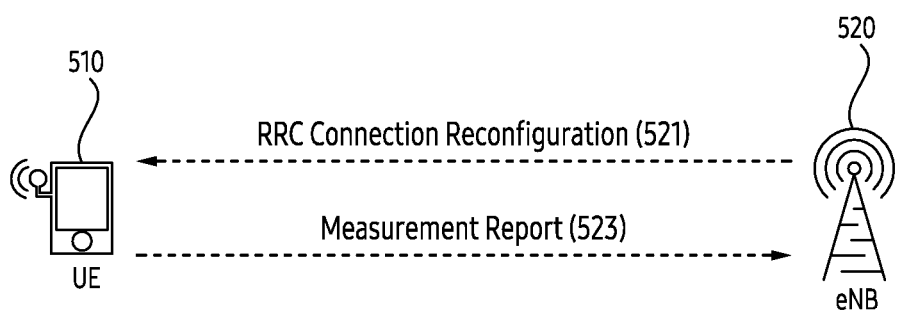
FIG. 5A illustrates an example of a measurement report and a handover command in a long term evolution (LTE) communication system according to an embodiment of the disclosure.

FIG. 5A illustrates an example of a measurement report and a handover command in a long term evolution (LTE) communication system according to an embodiment of the disclosure. A terminal may transmit a measurement report to A base station. The UE illustrates a terminal in the LTE communication system. The eNB illustrates a base station supporting an Evolved Universal Terrestrial Radio Access (E-UTRA) cell in the LTE communication system.

Referring to FIG. 5A, in operation 521, the eNB 520 may transmit an RRC connection reconfiguration message (e.g., RRCConnection reconfiguration of TS 36.331) to the UE 510. The RRC connection reconfiguration message may include a measurement configuration (e.g., a MeasureConfig information element (IE) of TS 36.331). The measurement configuration may include information for specifying measurements performed by the UE. The measurement configuration may support the configuration of a measurement gap, intra-frequency mobility, inter-frequency mobility, or inter-RAT mobility.

The measurement configuration may include measurement object information. The measurement object information may include information related to a cell for measurement. According to an embodiment, the measurement object information may include a cell list. The cell list may include a list of neighboring cells. Each cell in the list may be identified by a physical cell identity (PCI).

The measurement configuration may include a reporting configuration. The reporting configuration may include information related to a criteria for triggering a measurement report event. According to an embodiment, the reporting configuration may include at least one of a trigger type, configuration information on a trigger condition, a trigger quantity, a report quantity, a reporting interval, a report amount to indicate a number of measurement reports, or a maximum number of cells to be included in the measurement report. The trigger type indicates a periodical measurement report or an event-based measurement report. In the case of the periodical measurement report, the configuration information on the trigger condition may include information indicating a purpose. In the event-based measurement report, the configuration information for the trigger condition may include a hysteresis value, a time to trigger (TTT) value, an event type, and parameters (e.g., a threshold) required for the event type. The trigger quantity indicates a parameter for evaluating a triggering condition. The reporting quantity indicates a parameter to be included in the measurement report. The reporting interval represents the interval between measurement reports.

In operation 523, the UE 510 may transmit a measurement report message to the eNB 520. The UE 510 may perform measurement on one or more cells based on the RRC connection reconfiguration message. The UE 510 may obtain a measurement result based on the measurement. The UE 510 may transmit a measurement report message including the measurement result to the eNB 520. According to an embodiment, the measurement report message may include measurement information on a serving cell of the UE 510. The measurement information on the serving cell may include signal quality (e.g., RSRP, RSRQ, and SINR) for a signal (e.g., CRS) of the serving cell. According to an embodiment, the measurement report message may include measurement information on at least one neighboring cell of the UE 510. The measurement information on the neighboring cell may include at least one of PCI, cell global identification (CGI) information, or measurement result of the neighboring cell. The CGI information may include at least one of a global cell ID, a tracking area code (or a tracking area identifier), or a list of public land mobile network (PLMN) identifier. The measurement result of a neighboring cell may include signal quality (e.g., RSRP, RSRQ, and SINR) for a signal (e.g., CRS) of the neighboring cell.

After transmitting the measurement report from the UE 510, the serving base station eNB 520 may transmit a handover command. In case that the current serving cell of the UE 510 is not an optimal cell, the UE 510 needs to be connected to another cell. According to the embodiments of the disclosure, candidate cells of the UE 510 may be determined by the determination of the RAN controller (e.g., Near-RT RIC or Non-RT RIC). In case that the highest priority cell among the candidate cells is not current serving cell, the RAN controller may change the serving cell of the UE 510 through the eNB 520. The eNB 520 may transmit a handover command for handover to the UE 510 to the highest priority cell. According to an embodiment, the eNB 520 may transmit an RRC connection reconfiguration message (e.g., RRCConnectionReconfiguration of TS 36.331) including mobility control information (e.g., MobilityConfigInfo IE of TS 36.331) to the UE 510. The mobility control information may include at least one of a PCI of a target cell, a carrier frequency, a handover timer (e.g., a T304 timer), a radio network temporary identifier (RNTI) of the UE, or a radio resource configuration.

Figure 5B:
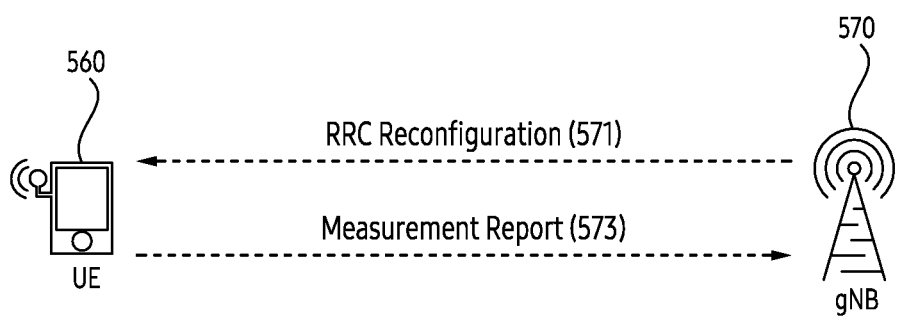
FIG. 5B illustrates an example of a measurement report and a handover command in a new radio (NR) communication system according to an embodiment of the disclosure.

FIG. 5B illustrates an example of a measurement report and a handover command in a new radio (NR) communication system according to an embodiment of the disclosure. A terminal may transmit a measurement report to a base station. A UE illustrates the terminal in an NR communication system. A gNB illustrates a base station supporting an NR cell in the NR communication system.

Referring to FIG. 5B, in operation 571, a gNB 570 may transmit an RRC reconfiguration message (e.g., RRCReconfiguration of TS 38.331) to the UE 560. The RRC reconfiguration message may include a measurement configuration (e.g., a MeasConfig IE (information element) of TS 38.331). The measurement configuration may include information for specifying measurements performed by the UE. The measurement configuration may support a configuration of a measurement gap, intra-frequency mobility, inter-frequency mobility, or inter-RAT mobility.

The measurement configuration may include measurement object information. The measurement object information may include information related to a cell for measurement. According to an embodiment, the measurement object information may include a cell list. The cell list may include a list of neighboring cells. Each cell in the list may be identified by a physical cell identity (PCI).

The measurement configuration may include a reporting configuration. The reporting configuration may include information related to a criteria for triggering a measurement report event. According to an embodiment, the reporting configuration may include a trigger type and configuration information on a trigger condition. The trigger type indicates a periodical measurement report or an event-based measurement report. In the case of the periodical measurement report, the configuration information on the trigger condition may include information indicating a purpose. In the event-based measurement report, the configuration information for the trigger condition may include a hysteresis value, a time to trigger (TTT) value, an event type, and parameters (e.g., a threshold) required for the event type. The configuration information on the trigger condition may include at least one of an RS type, report amount indicating a number of measurement reports, report quantity, reporting interval, a maximum number of cells to be included in the measurement report, or a maximum number of RS indexes to be included in the measurement report. The RS type may indicate the type of the measurement signal. For example, the RS type may indicate one of SSB and CSI-RS. The reporting quantity may indicate a parameter to be included in the measurement report. The reporting interval may indicate the interval between measurement reports.

In operation 573, the UE 560 may transmit a measurement report message to the gNB 570. The UE 560 may perform measurement on one or more cells based on the RRC reconfiguration message. The UE 560 may obtain a measurement result based on the measurement. The UE 560 may transmit a measurement report message including the measurement result to the gNB 570. According to an embodiment, the measurement report message may include measurement information on a serving cell of the UE 560. The measurement information on the serving cell may include signal quality (e.g., RSRP, RSRQ, and SINR) for a signal (e.g., CRS) of the serving cell. In some embodiments, the measurement information on the serving cell may additionally include signal quality for a signal of the best neighboring cell. According to an embodiment, the measurement report message may include measurement information on at least one neighboring cell of the UE 560.

In case that the neighboring cell is an NR cell, the measurement information on the neighboring cell may include a measurement result of a neighboring cell and a beam measurement result. The measurement result of a neighboring cell may include signal quality (e.g., RSRP, RSRQ, and SINR) for a signal (e.g., CSI-RS and SSB) of the neighboring cell. The beam measurement result may include information (e.g., rsIndexResults of TS 38.331) to indicate the optimal beam or beams that provide signal quality above a threshold value among beams of neighboring cells. In case that the neighboring cell is an E-UTRA cell, the measurement information on the neighboring cell may include at least one of PCI of neighboring cell, cell global identification (CGI) information, or measurement result of the neighboring cell. The CGI information may include at least one of a global cell ID, a tracking area code (or a tracking area identifier), or a list of public land mobile network (PLMN) identifiers. The measurement result of a neighboring cell may include signal quality (e.g., RSRP, RSRQ, SINR) for a signal (e.g., CRS) of the neighboring cell.

After transmitting the measurement report from the UE 560, the serving base station gNB 570 may transmit a handover command. In case that the current serving cell of the UE 560 is not an optimal cell, the UE 560 needs to be connected to another cell. According to embodiments of the disclosure, candidate cells of the UE 560 may be determined by the determination of the RAN controller (e.g., Near-RT RIC or Non-RT RIC). In case that the highest priority cell among the candidate cells is not the current serving cell, the RAN controller may change the serving cell of the UE 560 through the gNB 570. The gNB 570 may transmit a handover command for handover to the highest priority cell to the UE 560. According to an embodiment, the gNB 570 may transmit an RRC connection reconfiguration message (eg, RRCConnectionReconfiguration of TS 36.331) including synchronous reconfiguration information (eg, ReconfigurationWithSync IE of TS 38.331) to the UE 560. According to an embodiment, the gNB 570 may transmit an RRC connection reconfiguration message (e.g., RRCConnectionReconfiguration of TS 36.331) including synchronous reconfiguration information (e.g., ReconfigurationWithSync IE of TS 38.331) to the UE 560. The synchronous reconfiguration information may include at least one of SpCell (special cell) configuration information, carrier frequency, handover timer (e.g., T304 timer), radio network temporary identifier (RNTI) of the UE, and radio resource configuration. The SpCell may include a primary cell of a master cell group (MCG). The SpCell may include a PCell of the SCG in case that a secondary cell group (SCG) is configured.

In FIGS. 5A and 5B, a measurement report procedure in each of the LTE communication system and the NR communication system is described as a premise of operations of the RAN controller for matching an applicable cell to the UE. However, embodiments of the disclosure may also be applied in a wireless communication network in which an LTE cell (i.e., an E-UTRA cell) and an NR cell exist together. According to an embodiment, in case that the serving cell is the LTE cell and the neighboring cell is the NR cell, measurement reports described in FIGS. 5A and 5B may be used to determine the RAN controller. According to an embodiment, in case that the serving cell is the NR cell and the neighboring cell is the LTE cell, measurement reports described in FIGS. 5A and 5B may be used to determine the RAN controller. In addition, embodiments of the disclosure may be applied to measurement of a cell of a 2G/3G communication system (e.g., GERAN, GSM) in addition to LTE/NR.

The handover is performed by an operation between the UE and the target cell. When a measurement report (MR) is reported, the handover procedure may be initiated as the handover command to the cell included in the measurement report is delivered to the terminal. However, in case that the handover cell is determined based on measurement reports collected from one base station, it may not be sufficient to determine whether the connection between the terminal and the corresponding cell is excessive or insufficient. Accordingly, in the disclosure embodiments, a device and a method for collecting measurement reports reported to each base station by the RAN controller connected to the base stations and matching a specific cell to a terminal based on the collected measurement reports are proposed. The RAN controller may manage a plurality of cells. When a handover event occurs, the RAN controller may analyze measurement reports of multiple terminals and connect each terminal and cell. The RAN controller may collect measurement reports that are reported periodically as well as event occurrence. The RAN controller may match an applicable cell to each terminal based on the collected measurement reports.

Figure 6:
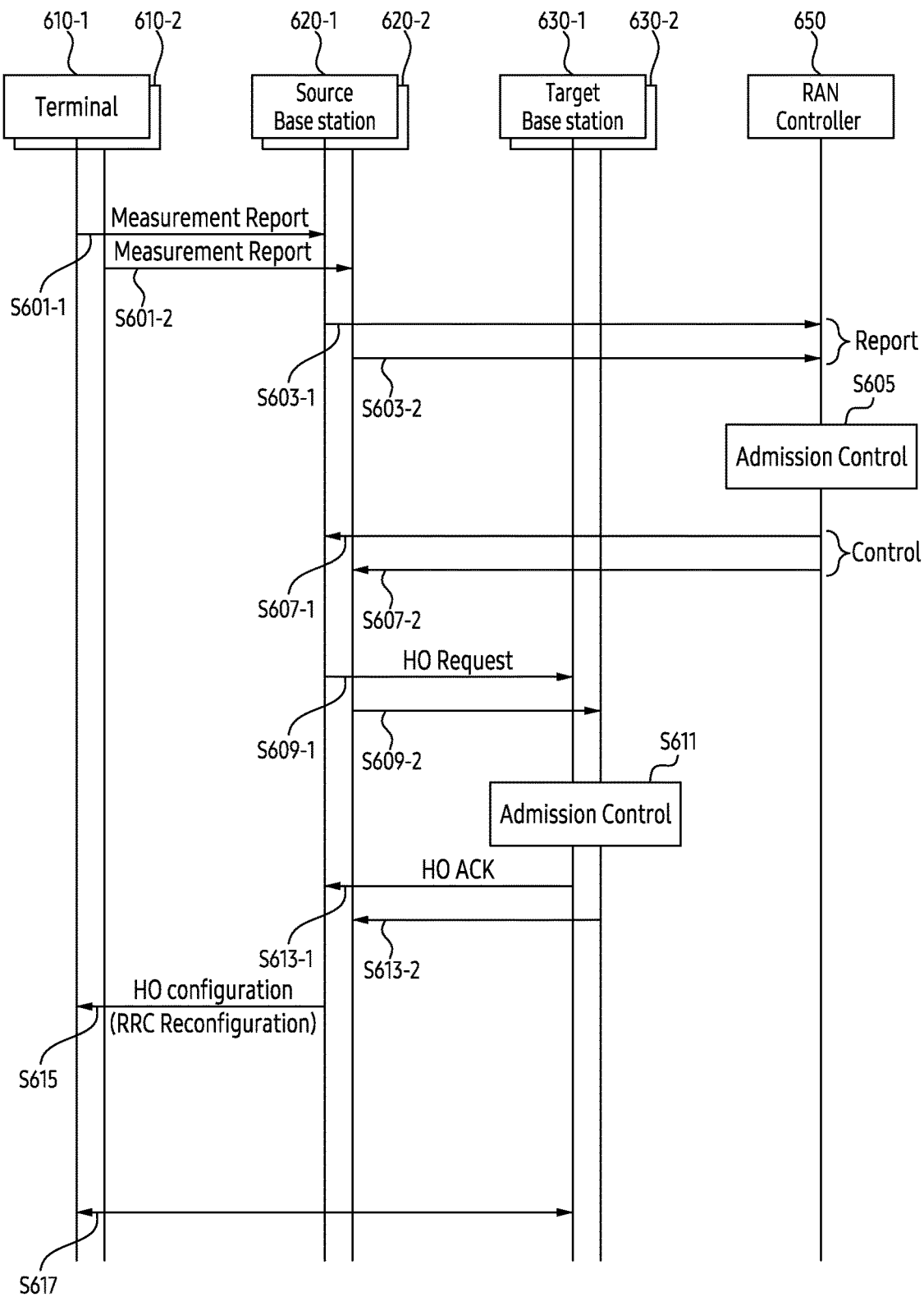
FIG. 6 illustrates signal flows between network entities for admission control, according to an embodiment of the disclosure.

FIG. 6 illustrates signal flows between network entities for admission control, according to an embodiment of the disclosure. In FIG. 6, a general procedure of operations related to admission control according to embodiments is described. Therefore, the descriptions described in FIG. 6 may be applied to at least some embodiments of FIGS. 7 to 21 as well as FIG. 6. Although FIG. 6 illustrates two terminals (e.g., the first terminal 610-1 and the second terminal 610-2), two source base stations (e.g., the first source base station 620-1 and the second source base station 620-2), and two target base stations (e.g., the first target base station 630-1 and the second target base station 630-2) as examples to explain operations for each terminal, embodiments of the disclosure may also be applied to the operation of three or more terminals, three or more base stations, and the RAN controller 650.

Referring to FIG. 6, in operation S601-1, the first terminal 610-1 may transmit a measurement report to the first source base station 620-1. A measurement report may be a measurement report for the eNB of FIG. 5A or a measurement report for the gNB of FIG. 5B. The first terminal 610-1 may measure the quality of one or more neighboring cells. The first terminal 610-1 may measure the quality of the serving cell provided by the first source base station 620-1. The first terminal 610-1 may transmit a measurement report including at least one measurement result among the serving cell or the one or more neighboring cells to the first source base station 620-1. The first terminal 610-1 may transmit a measurement report to the first source base station 620-1 periodically or based on the occurrence of an event according to the configuration of the first source base station 620-1.

In operation S601-2, the second terminal 610-2 may transmit a measurement report to the second source base station 620-2. The description of the first terminal 610-1 may be applied to the second terminal 610-2 in the same or similar manner. The second terminal 610-2 may measure the quality of one or more neighboring cells. The second terminal 610-2 may measure the quality of the serving cell provided by the second source base station 620-2. The second terminal 610-2 may transmit a measurement report including at least one measurement result among the serving cell or the one or more neighboring cells to the second source base station 620-2.

In operation S603-1, the first source base station 620-1 may transmit a report message to the RAN controller 650. The first source base station 620-1 may receive a measurement report from each terminal served by the first source base station 620-1. The terminal served by the first source base station 620-1 means that a serving cell of the terminal is provided to the first source base station 620-1. Although one terminal is described as an example in one base station in FIG. 6, the base station may receive a measurement report from each of a plurality of terminals. The first source base station 620-1 may generate a report message including a measurement report of each terminal. The first source base station 620-1 may transmit the generated report message to the RAN controller 650.

In operation S603-2, the second source base station 620-2 may transmit a report message to the RAN controller 650. The description of the first source base station 620-1 may be applied to the second source base station 620-2 in the same or similar manner. The second source base station 620-2 may receive a measurement report from each terminal served by the second source base station 620-2. The second source base station 620-2 may generate a report message including a measurement report of each terminal. The second source base station 620-2 may transmit the generated report message to the RAN controller 650.

In operation S605, the RAN controller 650 may perform admission control. The RAN controller 650 may receive a report message from each of one or more base stations connected to the RAN controller 650. The report message may include a measurement report of each terminal of the corresponding base station. The RAN controller 650 may perform admission control based on the collected measurement reports. The admission control is an effectiveness determination procedure for determining whether a serving cell connected to the current terminal is sufficient. For example, the RAN controller 650 may transmit information on a cell applicable to the specific terminal to the serving base station of the corresponding terminal. The RAN controller 650 may control a serving cell of a specific terminal to be changed from a current cell to another cell due to causes such as mobility of the terminal or load balancing. The RAN controller 650 may transmit information on a cell applicable to the specific terminal to the serving base station of the corresponding terminal.

In operation S607-1, the RAN controller 650 may transmit a control message to the first source base station 620-1. The control message may include information on one or more candidate cells of the first terminal 610-1. Herein, the candidate cell may be a cell determined by the RAN controller 650 to be suitable for the first terminal 610-1 based on a report message received from each base station connected to the RAN controller 650. According to an embodiment, the RAN controller 650 may identify one or more candidate cells of the first terminal 610-1 and inform the one or more candidate cells to the first source base station 620-1. In case of a terminal connected to the first source base station 620-1 as well as the first terminal 610-1, the RAN controller 650 may inform the first source base station 620-1 of the candidate cell of the corresponding terminal. The candidate cell may be transferred to the first source base station 620-1 in the form of a list for each terminal of the first source base station 620-1.

In operation S607-2, the RAN controller 650 may transmit a control message to the second source base station 620-2. The description of the first source base station 620-1 may be applied to the second source base station 620-2 in the same or similar manner. The control message may include information on one or more candidate cells of the second terminal 610-2. According to an embodiment, the RAN controller 650 may identify one or more candidate cells of the second terminal 610-2 and inform the one or more candidate cells to the second source base station 620-2. In case of a terminal connected to the second source base station 620-2 as well as the second terminal 610-2, the RAN controller 650 may inform the second source base station 620-2 of the candidate cell of the corresponding terminal.

In operation S609-1, the first source base station 620-1 may transmit a handover request message to the first target base station 630-1. The first source base station 620-1 may transmit a handover request message to the first target base station 630-1 through the Xn interface or the X2 interface. An interface between base stations may be determined according to a core network (e.g., EPC or 5GC) connected to each base station. According to an embodiment, the handover request message may include a target cell ID. The target cell ID may be identification information of a cell provided by the first target base station 630-1. The target cell ID may be a global ID (e.g., E-UTRA cell global identifier (CGI) or NR CGI). A cell indicated by the target cell ID may be a candidate cell indicated by the RAN controller 650. According to an embodiment, the handover request message may include a UE ID. The UE ID may be indicated by the control message of operation 607-1, which is a previous procedure. The UE ID may uniquely identify the UE at the Xn interface between the first source base station 620-1 and the first target base station 630-1. For example, the UE ID may be an NG-RAN node UE XnAP ID.

The handover request message may be transmitted to request preparation of resources for handover. For example, the handover request message may include UE context information. The UE context information may include security information (e.g., access stratum (AS) security information) and UE security capabilities. For example, the handover request message may include AMF identification information (e.g., globally unique AMF identifier (GUAMI)). Individual IEs defined in the standard of 3GPP TS 38.423 (e.g., Section 9.1.1.1 of 3GPP TS 38.423) may be included in the handover request message. According to an embodiment, the RAN controller 650 of the disclosure may transmit at least part of the corresponding IEs to the first source base station 620-1 through a control message.

In operation S609-2, the second source base station 620-2 may transmit a handover request message to the second target base station 630-2. The description of the first source base station 620-1 and the first target base station 630-1 may be applied in the same or similar manner to each of the second source base station 620-2 and the second target base station 630-2. According to an embodiment, the handover request message may include a target cell ID. According to an embodiment, the handover request message may include a UE ID.

In operation S611, the first target base station 630-1 may perform admission control. The first target base station 630-1 may accept the handover request to the target cell indicated by the handover request message of the first source base station 620-1. The first target base station 630-1 may generate RRC reconfiguration information related to the target cell. Likewise, the second target base station 630-2 may perform admission control. The second target base station 630-2 may accept the handover request to the target cell indicated by the handover request message of the second source base station 620-2. The second target base station 630-2 may generate RRC reconfiguration information related to the target cell.

In operation S613-1, the first target base station 630-1 may transmit a handover request confirmation message. The handover request confirmation message may include RRC reconfiguration information related to the target cell of the first target base station 630-1. In operation S613-2, the second target base station 630-2 may transmit a handover request confirmation message. The handover request confirmation message may include RRC reconfiguration information related to the target cell of the second target base station 630-2.

In operation S615, the first source base station 620-1 may transmit the handover configuration to the first terminal 610-1. The handover configuration may include RRC configuration information of operation 613-1. The handover configuration may include information required for access to at least one cell ID and the target cell. The first source base station 620-1 may transmit an RRC reconfiguration message including the handover configuration to the first source base station 620-1. The RRC reconfiguration message may correspond to the handover command of FIG. 5A or 5B.

In operation S617, the first terminal 610-1 may perform a connection procedure with the first target base station 630-1. The first terminal 610-1 may disconnect the connection with the previous serving cell and access the new cell based on the handover configuration. The first terminal 610-1 may perform a random access procedure with a target cell of the first target base station 630-1.

Although not illustrated in FIG. 6, an operation of transmitting RRC reconfiguration information may be equally applied between the second terminal 610-2 and the second source base station 620-2.

As described with reference to FIG. 6, the RAN controller 650 may manage a network state of each cell for each terminal. The network state may be stabilized by the RAN controller 650. The RAN controller 650 may perform analysis on all base stations (e.g., the first source base station 620-1, the second source base station 620-2, the first target base station 630-1, and the second target base station 630-2) connected to the RAN controller 650. Each source base station may not perform the handover request only based on the measurement report of the terminal, but may perform the handover request under the control of the RAN controller 650. The optimal cell may be matched to the terminal by performing a handover request according to the control message by the RAN controller 650 based on both the channel state and the load amount at each of the base stations connected to the RAN controller 650.

Meanwhile, even if the terminal attempts to access the candidate cell indicated by the RAN controller 650 for handover, the access may fail. In case that the access fails, an RRC re-establishment (RRE) procedure is performed. Specifically, the terminal may start a handover timer (e.g., T304 timer) after receiving a handover command (e.g., RRC reconfiguration message). In case that the random access procedure is not successfully completed until the handover timer expires, the terminal may identify handover failure. The terminal may perform cell reselection through the RRE procedure. Since such cell reselection is performed in a RRC IDLE state, a delay occurs in connection to a new cell. In state that the serving base station already knows the multiple candidate cells, it may be unnecessary for the terminal to find the next cell through cell reselection. Therefore, the disclosure proposes to perform the handover procedure to the next candidate cell before the handover timer expires, that is, without cell reselection. In other words, the handover is performed after the failure of the access while maintaining a radio resource control (RRC) connection state.

Figure 7:
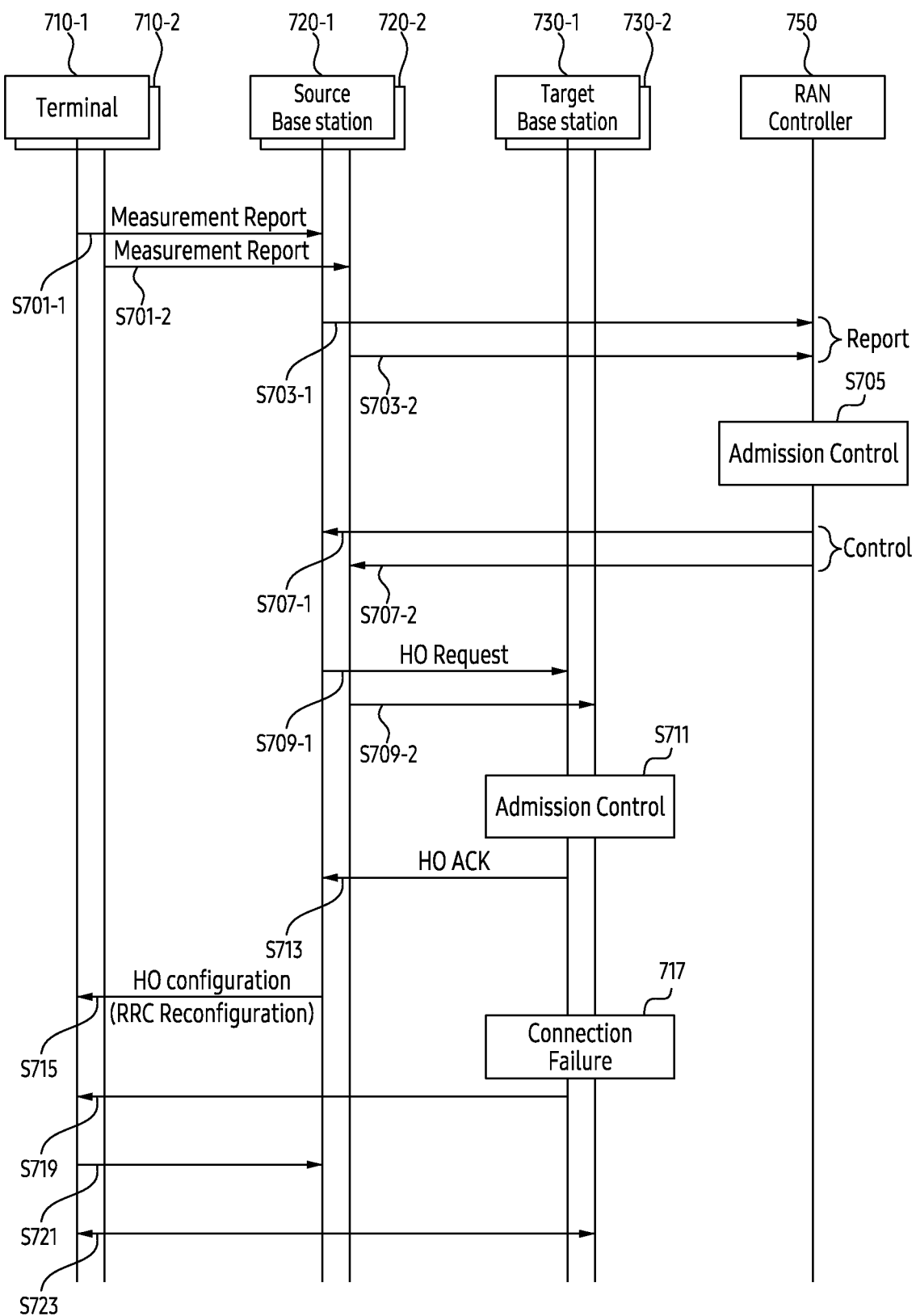
FIG. 7 illustrates signal flows between network entities for candidate cell-based admission control, according to an embodiment of the disclosure.

FIG. 7 illustrates signal flows between network entities for candidate cell-based admission control, according to an embodiment of the disclosure. The candidate cell-based admission control refers to a technology for quickly performing handover to the next candidate cell even in a case in which the connection to a specific cell fails through a plurality of candidate cells provided by the RAN controller. Hereinafter, for convenience of explanation, after connection failure of a specific cell, a handover according to connection to a candidate cell having the next priority may be referred to as a recovery handover. Operations of the terminal, the base station, and the RAN controller described in FIG. 6 may be applied in FIG. 7. Although the disclosure describes two terminals (e.g., the first terminal 710-1 and the second terminal 710-2), two source base stations (e.g., the first source base station 720-1 and the second source base station 720-2), and two target base stations (e.g., the first target base station 730-1 and the second target base station 730-2) as an example to describe the operation of each terminal, the embodiments of the disclosure may also be applied to three or more terminals, three or more base stations, and the operation of the RAN controller 750.

Referring to FIG. 7, in operation S701-1, the first terminal 710-1 may transmit a measurement report to the first source base station 720-1. The measurement report may be a measurement report for the eNB of FIG. 5A or a measurement report for the gNB of FIG. 5B. The first terminal 710-1 may measure the quality of one or more neighboring cells. The first terminal 710-1 may measure the quality of the serving cell provided by the first source base station 720-1. The first terminal 710-1 may transmit a measurement report including at least one measurement result among the serving cell or the one or more neighboring cells to the first source base station 720-1. The first terminal 710-1 may transmit a measurement report to the first source base station 720-1 periodically or based on the occurrence of an event according to the configuration of the first source base station 720-1.

In operation S701-2, the second terminal 710-2 may transmit a measurement report to the second source base station 720-2. The second terminal 710-2 may measure the quality of the serving cell provided by the second source base station 720-2. The second terminal 710-2 may transmit a measurement report including at least one measurement result among the serving cell or the one or more neighboring cells to the second source base station 720-2.

In operation S703-1, the first source base station 720-1 may transmit a report message to the RAN controller 750. The first source base station 720-1 may receive a measurement report from each terminal served by the first source base station 720-1. The first source base station 720-1 may generate a report message including a measurement report of each terminal. The first source base station 720-1 may transmit the generated report message to the RAN controller 750.

In operation S703-2, the second source base station 720-2 may transmit a report message to the RAN controller 750. The second source base station 720-2 may receive a measurement report from each terminal served by the second source base station 720-2. The second source base station 720-2 may generate a report message including a measurement report of each terminal. The second source base station 720-2 may transmit the generated report message to the RAN controller 750.

In operation S705, the RAN controller 750 may perform admission control. The RAN controller 750 may receive a report message from each of one or more base stations connected to the RAN controller 750. The report message may include a measurement report of each terminal of the corresponding base station. The RAN controller 750 may perform admission control based on the collected measurement reports.

According to an embodiment, the RAN controller 750 may identify candidate cells for serving a specific terminal. The candidate cell may refer to a cell identified as providing a service to a specific UE by the determination of the RAN controller among a serving cell and neighboring cells of the UE. The RAN controller 750 may identify candidate cells corresponding to a specific terminal based on the collected measurement reports. The RAN controller 750 may provide a terminal with quick access by identifying a plurality of candidate cells.

In operation S707-1, the RAN controller 750 may transmit a control message to the first source base station 720-1. According to an embodiment, the RAN controller 750 may identify a candidate cell list for each terminal based on the collected measurement reports. The RAN controller 750 may provide a candidate cell list corresponding to the terminal to the serving base station of the corresponding terminal.

The control message may include information on one or more candidate cells of the first terminal 710-1. According to an embodiment, the control message may include identification information on a plurality of candidate cells for the first terminal 710-1. The RAN controller 750 may include identification information on a plurality of candidate cells in the control message so that handover to the next candidate cell is initiated in response to the connection failure of a specific candidate cell. A global ID may be used to indicate a specific candidate cell among cells of multiple base stations. For example, E-UTRA CGI or NR CGI may be used as identification information for indicating a candidate cell. According to an embodiment, the control message may indicate the priority of each candidate cell. For example, the control message may include cell identification information in the order of priority. For another example, the control message may additionally include a priority indicator for each cell.

According to an embodiment, the control message may include identification information of the first terminal 710-1. The RAN controller 750 may include identification information of the first terminal 710-1 in the control message to indicate a candidate cell corresponding to the first terminal 710-1. The identification information of the first terminal 710-1 may be a global UE ID for identifying the first terminal 710-1 between multiple cells. For example, the identification information may include the RAN UE ID of the first terminal 710-1. For another example, the identification information may include a global unique temporary identifier (GUTI) of the first terminal 710-1. As still another example, the information may include a temporary mobile subscriber identity (TMSI) of the first terminal 710-1.

In operation S707-2, the RAN controller 750 may transmit a control message to the second source base station 720-2. The control message may include information on one or more candidate cells of the second terminal 710-2. According to an embodiment, the RAN controller 750 may identify a candidate cell list for each terminal based on the collected measurement reports. The RAN controller 750 may provide a candidate cell list corresponding to the terminal to the serving base station of the corresponding terminal.

The control message may include information on one or more candidate cells of the second terminal 710-2. According to an embodiment, the control message may include identification information on a plurality of candidate cells for the second terminal 710-2. The RAN controller 750 may include identification information on a plurality of candidate cells in the control message so that handover to the next candidate cell is initiated in response to the connection failure of a specific candidate cell. A global ID may be used to indicate a specific candidate cell among cells of multiple base stations. For example, E-UTRA CGI or NR CGI may be used as identification information for indicating a candidate cell. According to an embodiment, the control message may indicate the priority of each candidate cell. For example, the control message may include cell identification information in the order of priority. For another example, the control message may additionally include a priority indicator for each cell.

According to an embodiment, the control message may include identification information of the second terminal 710-2. The RAN controller 750 may include identification information of the second terminal 710-2 in the control message to indicate that the RAN controller 750 is a candidate cell corresponding to the second terminal 710-2. The identification information of the second terminal 710-2 may be a global UE ID for identifying the second terminal 710-2 between multiple cells. For example, the identification information may include the RAN UE ID of the second terminal 710-2. For another example, the identification information may include GUTI (e.g., GUTI or 5G GUTI) of the second terminal 710-2. For still another example, the identification information may include TMSI (e.g., TMSI or 5G TMSI) of the second terminal 710-2.

In operation S709-1, the first source base station 720-1 may transmit a handover request message to the first target base station 730-1. The first source base station 720-1 may transmit a handover request message to the first target base station 730-1 through the Xn interface or the X2 interface. According to an embodiment, the handover request message may include a target cell ID. The target cell ID may be identification information of a cell provided by the first target base station 730-1. The target cell ID may be a global ID (e.g., E-UTRA cell global identifier (CGI) or NR CGI). The cell indicated by the target cell ID may be a candidate cell indicated by the RAN controller 750. According to an embodiment, the handover request message may include a UE ID. The UE ID may be indicated by a control message of operation 707-1, which is a previous procedure. The UE ID may uniquely identify the UE at the Xn interface between the first source base station 720-1 and the first target base station 730-1. For example, the UE ID may be an NG-RAN node UE XnAP ID.

In operation S709-2, the second source base station 720-2 may transmit a handover request message to the second target base station 730-2. According to an embodiment, the handover request message may include a target cell ID. According to an embodiment, the handover request message may include a UE ID.

In operation S711, the first target base station 730-1 may perform admission control. The first target base station 730-1 may accept the handover request to the target cell indicated by the handover request message of the first source base station 720-1. The first target base station 730-1 may generate RRC reconfiguration information related to the target cell. Likewise, the second target base station 730-2 may perform admission control. The second target base station 730-2 may accept the handover request to the target cell indicated by the handover request message of the second source base station 720-2. The second target base station 730-2 may generate RRC reconfiguration information related to the target cell.

In operation S713, the first target base station 730-1 may transmit a handover request confirmation message. The handover request confirmation message may include RRC reconfiguration information related to the target cell of the first target base station 730-1.

In operation S715, the first source base station 720-1 may transmit the handover configuration to the first terminal 710-1. According to an embodiment, the handover configuration may include identification information on a plurality of candidate cells for the first terminal 710-1. The first source base station 720-1 may generate a handover configuration based on identification information on a plurality of candidate cells received through operation S707-1. The plurality of candidate cells may be identified according to the candidate cell-based admission control of the RAN controller 750. Although FIG. 7 illustrates that the first source base station 720-1 transmits a handover request message only to the first target base station 730-1, embodiments of the disclosure are not limited thereto. In order to obtain information related to other candidate cells other than the target cell with the highest priority, the first source base station 720-1 may also transmit a handover request message to a base station of another target cell and receive a handover request confirmation message from the base station of the other target cell. The handover configuration may include IDs of a plurality of target cells and information required for access to each target cell.

The first terminal 710-1 may perform an access attempt by using the candidate cell with the highest priority among the candidate cells as the target cell. When the first terminal 710-1 fails to connect the target cell (e.g., the cell of the first target base station 730-1), the first terminal 710-1 may perform a connection attempt (e.g., transmission of a random access preamble) to the next priority candidate cell (e.g., the cell of the second target base station 730-2). Accordingly, when the connection to the target cell fails, the first source base station 720-1 may include information on the candidate cell (i.e., a candidate cell with the second highest priority) for immediate reconnection in the handover configuration, in addition to information on a target cell (i.e., a candidate cell with the highest priority) for handover to the first terminal 710-1. The first source base station 720-1 may transmit an RRC reconfiguration message including the handover configuration to the first source base station 720-1. The RRC reconfiguration message may correspond to the handover command of FIG. 5A or 5B.

According to an embodiment, the RRC reconfiguration message for the handover command may include information on a plurality of target cells (i.e., information on candidate cells). The information on each target cell may include identification information for identifying the candidate cell and information related to connection of the candidate cell. Accordingly, an RRC reconfiguration message including additional information in the current standard may be defined. For example, an RRC reconfiguration message (e.g., RRC reconfiguration message including ReconfigurationWithSync IE of 3GPP TS 38.331) indicating a handover may include information related to multiple cell connections (e.g., Serving CellConfigCommon IE of 3GPP TS 38.331).

In operation S717, the first target base station 730-1 may detect a connection failure. The first target base station 730-1 may detect that the first terminal 710-1 fails to connect to the target cell of the first target base station 730-1. According to an embodiment, in case that there is no access attempt by the first terminal 710-1 for a certain interval despite the transmission of the handover request confirmation message of operation S713, the first target base station 730-1 may detect that the connection to the target cell fails. According to an embodiment, in case that the random access preamble(s) of the first terminal 710-1 is received more than the designated number of times, but the random access procedure is not successful, the first target base station 730-1 may detect that the connection to the target cell fails. According to an embodiment, in a case of detecting that the channel quality of the target cell is degraded to a certain level or more, the first target base station 730-1 may detect that the connection to the target cell fails.

In operation S719, the first target base station 730-1 may transmit a notification message indicating that the connection to the target cell has failed to the first terminal 710-1. The first target base station 730-1 may transmit the notification message to the first terminal 710-1 so that the first terminal 710-1 immediately initiates a handover to a candidate cell having a priority next to the target cell. According to an embodiment, the notification message may simply be a message indicating that it has failed. In operation S723 to be described later, the first terminal 710-1 may perform a connection procedure to a candidate cell having a priority next to the target cell. According to another embodiment, the notification message may indicate the next candidate cell. In order for the notification message to indicate the next candidate cell, the first source base station 720-1 may transmit information indicating the candidate cell to the first target base station 730-1, in operation S709-1. The handover request message may include information indicating the candidate cell.

In operation S721, the first terminal 710-1 may transmit an indication message indicating that the target cell has been changed to the first source base station 720-1. The first terminal 710-1 may notify the first source base station 720-1, which is a serving base station, that the target cell has been changed in order to perform a continuous handover procedure. Although not illustrated in FIG. 7, the first source base station 720-1 may transmit a handover request message in advance to the second target base station 730-2, which is a candidate cell of the next priority next to the target cell. The second target base station 730-2 may transmit a handover request confirmation message to the first source base station 720-1. The first terminal 710-1 may perform operation S723, which is a next operation, before entering the RRE procedure.

In operation S723, the first terminal 710-1 may perform a connection procedure with the second target base station 730-2. The first terminal 710-1 may perform a connection procedure to the next candidate cell. For example, in case that the cell having the next priority after the failed target cell is the cell of the second target base station 730-2, the first terminal 710-1 may perform a connection procedure with the second target base station 730-2. The first terminal 710-1 may perform a random access procedure on the next candidate cell. The first terminal 710-1 may disconnect the connection with the previous serving cell and access a new cell based on the handover configuration. The first terminal 710-1 may perform a random access procedure with a cell of the first target base station 830-1.

According to an embodiment, operation S723 may be required to be performed before the T304 timer expires. When a handover failure occurs, the terminal must return to the initial state and perform all procedures (e.g., RRE). However, since candidate cells identified by the control of the RAN controller are provided to the terminal through handover command transmission, the terminal may quickly attempt to access the next candidate cell even in a case in which handover to the target cell fails. According to the current 3GPP standard, the terminal starts the T304 timer after receiving the handover command. In case that the random access is not successfully completed until the T304 timer expires, the terminal must perform an RRE procedure. Accordingly, the terminal may perform operation S723 before the T304 timer expires.

In FIG. 7, a notification message in which the first target base station 730-1 notifies the first terminal 710-1 of the connection failure of the target cell with the highest priority is described. However, embodiments of the disclosure are not limited thereto. According to another embodiment, the terminal may determine by itself that the connection to the target cell has failed. For example, the terminal may determine that the connection to a specific cell has failed even before the T304 timer expires based on the current channel state of the terminal. For another example, the terminal may determine that the connection to a specific cell has failed even before the T304 timer expires based on the number of access attempts of the terminal. For another example, in a case in which random access is not successfully completed within a certain interval of the length of the T304 timer (e.g., 50% of the T304 timer), the terminal may determine that the connection to a specific cell has failed. In response to the determination, the terminal may perform an access attempt to a candidate cell having an immediately next priority.

Although not shown in FIG. 7, a new message may be defined for a recovery handover procedure based on a plurality of candidate cells. In FIG. 7, an embodiment in which identification information on a plurality of candidate cells identified by the RAN controller is included in the handover command is described, but a recovery handover procedure may be defined in another manner. Handover to the candidate cell may be initiated early by controlling of the target base station. The target base station may notify the terminal that the handover access to the current target cell fails, and may indicate the next candidate cell to the terminal at the same time. In the handover request procedure (exchange procedure of handover request message and handover request confirmation message), the target base station may recognize information on the next candidate cell from the serving base station.

Figure 8:
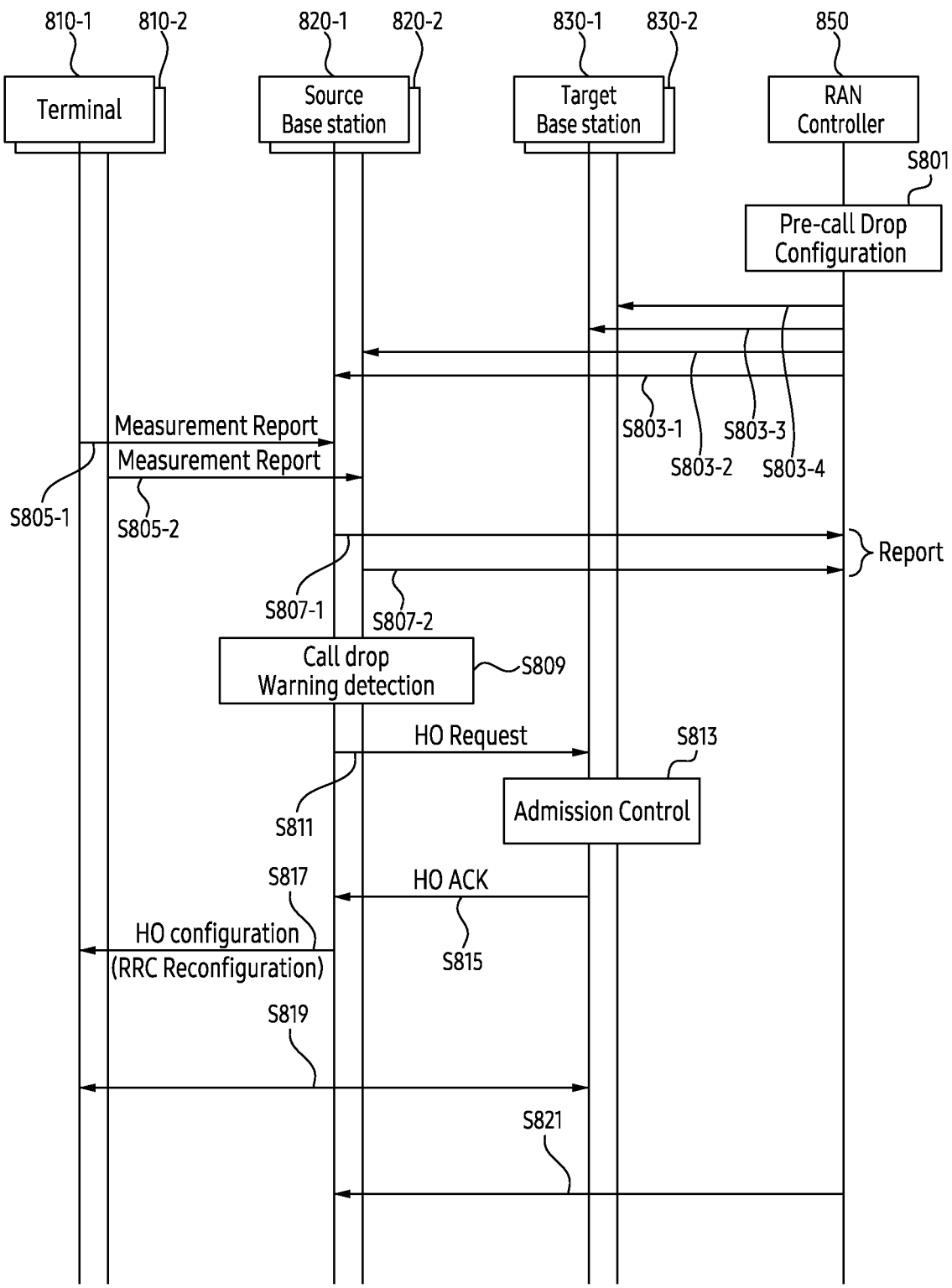
FIG. 8 illustrates signal flows between network entities for pre-detection of a call-drop, according to an embodiment of the disclosure.

FIG. 8 illustrates signal flows between network entities for pre-detection of a call-drop, according to an embodiment of the disclosure. The pre-detection of a call-drop means a procedure for predicting a call-drop before a call-drop occurs. Disconnection of the connection may be prevented by initiating handover in advance in a situation where call-drop is expected. In the disclosure, although two terminals (e.g., the first terminal 810-1 and the second terminal 810-2), two source base stations (e.g., the first source base station 820-1 and the second source base station 820-2), and two target base stations (e.g., the first target base station 830-1 and the second target base station 830-2) are described as examples to describe the operation of each terminal, embodiments of the disclosure may also be applied to operations between three or more terminals, three or more base stations, and the RAN controller 850.

Referring to FIG. 8, in operation S801, the RAN controller 850 may generate configuration information for pre-detection of the call-drop. According to embodiments, the configuration information may include at least one parameter related to pre-detection of call-drop at each base station. According to an embodiment, the configuration information may include identification information of the base station. According to an embodiment, the configuration information may include a period for determining pre-detection of the call-drop. According to an embodiment, the configuration information may include an interval for determining pre-detection of the call-drop. According to an embodiment, the configuration information may include a threshold value required for the condition for pre-detection of the call-drop, a hysteresis value, and a type of condition. The RAN controller 850 may independently generate configuration information for each base station. For example, configuration information for pre-detection of call-drop in the first source base station 820-1 and configuration information for pre-detection of call-drop in the second source base station 820-2 may exist separately.

According to embodiments, the configuration information may include a parameter defining an operation of the base station during pre-detection of a call-drop in the base station. According to an embodiment, when pre-detection of the call-drop for the terminal, the configuration information may indicate that a handover command to a cell based on a measurement report is transmitted to the terminal.

In operation S803-1, the RAN controller 850 may transmit configuration information for the first source base station 820-1 to the first source base station 820-1. The configuration information may include at least one parameter related to pre-detection of call-drop in the first source base station 820-1. In operation S803-2, the RAN controller 850 may transmit configuration information for the second source base station 820-2 to the second source base station 820-2. The configuration information may include at least one parameter related to pre-detection of call-drop in the second source base station 820-2. Like the source base station, the target base station may also be a serving base station with respect to a terminal (i.e., terminals different from the first terminal 810-1 and the second terminal 810-2) that serves. In operation S803-3, the RAN controller 850 may transmit configuration information for the first target base station 830-1 to the first target base station 830-1. In operation S803-4, the RAN controller 850 may transmit configuration information for the second target base station 830-2 to the second target base station 830-2.

In operation S805-1, the first terminal 810-1 may transmit a measurement report to the first source base station 820-1. In operation S805-2, the second terminal 810-2 may transmit a measurement report to the second source base station 820-2.

In operation S807-1, the first source base station 820-1 may transmit a report message to the RAN controller 850. The first source base station 820-1 may receive a measurement report from each terminal served by the first source base station 820-1. The first source base station 820-1 may generate a report message including a measurement report of each terminal. The first source base station 820-1 may transmit the generated report message to the RAN controller 850. Likewise, in operation S807-2, the second source base station 820-2 may transmit a report message to the RAN controller 850.

In operation S809, the first source base station 820-1 may detect a warning of a call-drop. The operation of detecting the warning of call-drop rather than call-drop means pre-detection of call-drop. The first source base station 820-1 may perform pre-detection of the call-drop based on configuration information related to pre-detection of the call-drop received in operation S801-1. The pre-detection of the call-drop may include a process in which the first source base station 820-1 monitors the first terminal 810-1.

According to an embodiment, when the channel quality for the serving cell of the first terminal 810-1 is lowered below a threshold value, the first source base station 820-1 may detect warning of a call-drop. In this case, the threshold value may be less than a threshold value for determining a radio link failure (RLF). The channel quality for the serving cell may be identified from the measurement of the first source base station 820-1 or the report of the first terminal 801-1.

According to an embodiment, the first source base station 820-1 may detect a warning of a call-drop before a certain time before the designated timer (e.g., the T310 and T311 timers) expires. Since RRE is performed after RLF occurs and call-drop occurs when RRE is not successful, the first source base station 820-1 may detect a warning of a call-drop before a certain time before the designated timer expires.

According to an embodiment, the first source base station 820-1 may detect a call-drop warning, when the number of instructions of 'out-of-sync' of the first terminal 810-1 reaches the reference number. In this case, the reference number may be smaller than the maximum number configured for RLF.

In operation S811, the first source base station 820-1 may transmit the handover request message to the first target base station 830-1. According to an embodiment, the handover request message may include a target cell ID. The target cell ID may indicate a neighboring cell included in the measurement report of the first terminal 801-1. The first source base station 820-1 may handover the first terminal 810-1 to the target cell indicated by the measurement report before the call is dropped (e.g. before RLF occurs or before RRE failure even in a case in which RLF occurs) through the pre-detection operation of the call-drop. According to an embodiment, the handover request message may include a UE ID. The handover request message may include a UE ID in order to indicate the first terminal 810-1, which is subject to handover, to the first target base station 830-1.

In operation S813, the first target base station 830-1 may perform admission control. The first target base station 830-1 may accept the handover request to the target cell indicated by the handover request message of the first source base station 820-1. The first target base station 830-1 may generate RRC reconfiguration information related to the target cell.

In operation S815, the first target base station 830-1 may transmit a handover acknowledge message to the first source base station 820-1.

In operation S817, the first source base station 820-1 may transmit the handover configuration to the first terminal 810-1. The handover configuration may include identification information on a target cell of the first target base station 830-1. According to an embodiment, the handover configuration may include identification information on one target cell and information for connection to the target cell. According to another embodiment, the handover configuration may include identification information on a plurality of candidate cells for the first terminal 810-1 and information for access to each candidate cell. In other words, the embodiments illustrated in FIG. 8 may be combined with the embodiment of FIG. 7.

In operation S819, the first terminal 810-1 may perform a connection procedure with the first target base station 830-1. The first terminal 810-1 may disconnect the connection with the previous serving cell and access the new cell based on the handover configuration. The first terminal 810-1 may perform a random access procedure with a target cell of the first target base station 830-1.

In operation S821, the RAN controller 850 may transmit a cancellation message of the pre-detection configuration of the call-drop to the first source base station 820-1. This is because the determination of pre-detection is no longer necessary because the terminal has recovered channel quality through handover. However, in some other embodiments, in case that a terminal connected to the first source base station 820-1 exists, the RAN controller 850 may not perform operation S821.

Although not shown in FIG. 8, the RAN controller 850 may transmit a cancellation message of the pre-detection configuration to the serving base station of the terminal when the other terminal handover from the serving cell.

Although not shown in FIG. 8, the RAN controller 850 may perform pre-detection of call-drop and handover for each of the base stations connected to the RAN controller 850 as well as the first source base station 820-1. The RAN controller 850 may reduce the occurrence of transmission interruption by configuring a criteria related to a call-drop of each base station or occurrence of RLF. When warning of the call-drop is detected while waiting for the handover configuration through the control message (e.g., control message of operation S707-1 and operation S707-2 in FIG. 7) of the RAN controller 850, each base station may handover the terminal to a neighboring cell.

Based on the condition configured by the RAN controller 850, the serving base station may perform handover to the target cell that is adaptively selected according to the state of the terminal. As the target cell is adaptively selected, disconnection warning of the terminal may be reduced. As the UE performs handover before RLF occurs or before call-drop occurs, the service performance of the UE may be optimized.

Figure 9:
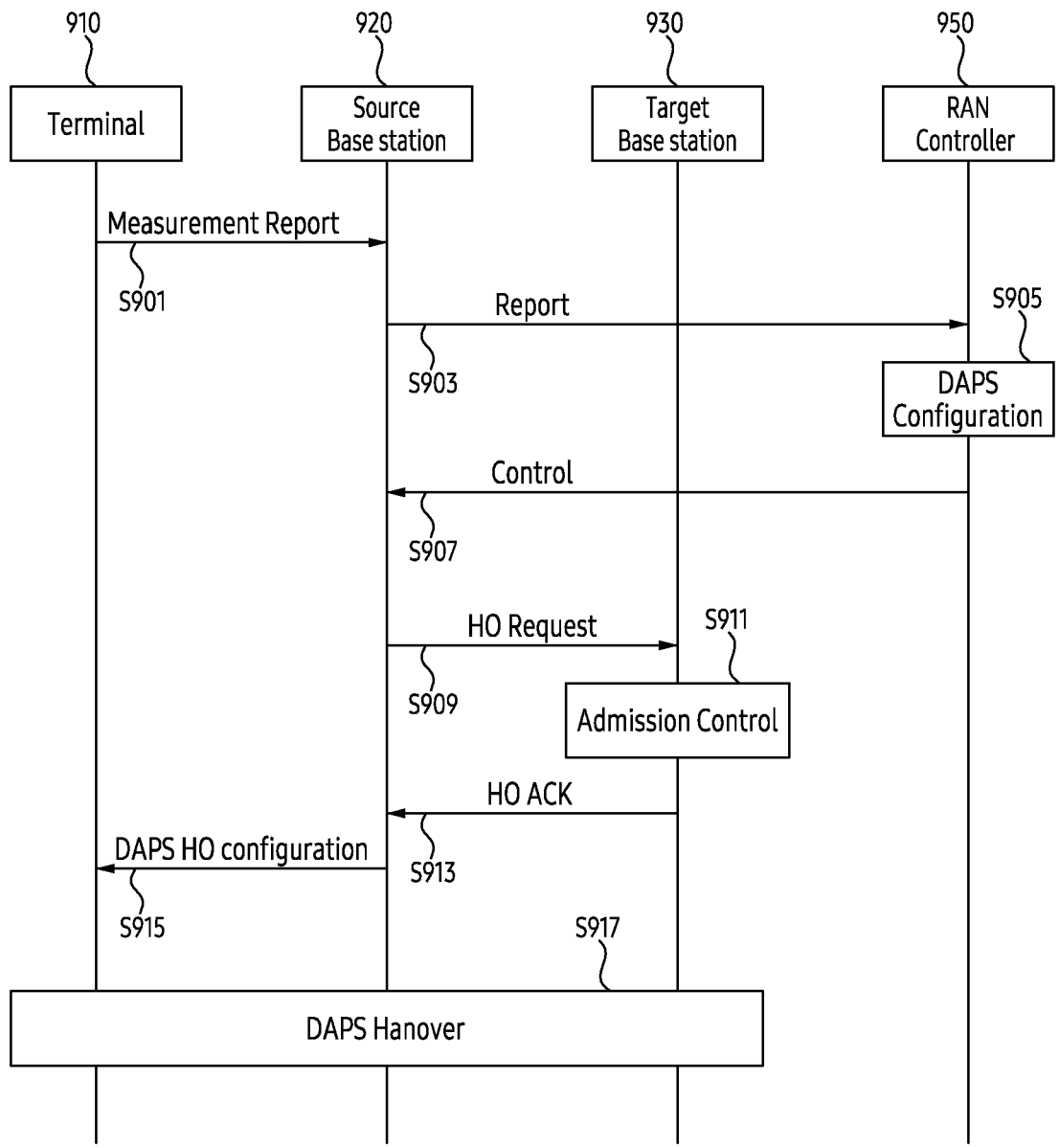
FIG. 9 illustrates signal flows between network entities for a dual-adaptive protocol stack (DAPS) handover, according to an embodiment of the disclosure.

FIG. 9 illustrates signal flows between network entities for a dual-adaptive protocol stack (DAPS) handover, according to an embodiment of the disclosure. DAPS handover refers to a handover that maintains a source cell connection until the random access to the target cell is success after receiving an RRC message and the source cell is released. For DAPS handover, the terminal may continue to receive downlink user data from the source base station until the source cell is released and continue to transmit uplink user data for the source base station until a random access procedure for the target base station is successfully performed.

Referring to FIG. 9, in operation S901, the terminal 910 may transmit a measurement report to the source base station 920. The terminal 910 may measure the quality of one or more neighboring cells. The terminal 910 may measure the quality of the serving cell provided by the source base station 920. The terminal 910 may transmit a measurement report including at least one measurement result among the serving cell or the one or more neighboring cells to the source base station 920.

In operation S903, the source base station 920 may transmit the report message to the RAN controller 950. The source base station 920 may receive a measurement report from each terminal served by the source base station 920. The source base station 920 may generate a report message including a measurement report of each terminal.

In operation S905, the RAN controller 950 may generate a DAPS configuration. The RAN controller 950 may determine DAPS handover for a terminal related to a service in which latency is important. The RAN controller 950 may identify a service provided to the terminal 910 reporting the measurement report. According to an embodiment, the RAN controller 950 may identify QoS information of a data radio bearer (DRB) configured in the terminal 910 or a quality of service (QoS) flow. The RAN controller 950 may identify the type of service currently provided to the terminal based on the QoS information. In addition, according to an embodiment, the RAN controller 950 may identify a network slice related to the terminal 910. The network slices may be indicated by Single Network Slice Selection Assistance Information (S-NSSAI) and protocol data unit (PDU). The RAN controller 950 may identify the type of service currently provided to the terminal from the value of the slice/service type (SST) indicated by the S-NSSAI. The RAN controller 950 may determine DAPS handover in case that the type of service is an urgent service (e.g., ultra-reliable low latency communication (URLLC)). In this case, in order to indicate a type of service of the terminal to the RAN controller 950, the report message may include information on a network slice.

The RAN controller 950 may generate a DAPS configuration in response to determining the DAPS handover. According to an embodiment, the DAPS configuration may include an uplink power configuration. For example, the uplink transmission configuration includes at least one of information indicating maximum transmission power in the source-cell group, maximum transmission power in the target-cell group, and power sharing mode. According to an embodiment, the DAPS configuration may include information for indicating that a bearer is configured as a DAPS bearer.

In operation S907, the RAN controller 950 may transmit a control message to the source base station 920. According to an embodiment, the RAN controller 950 may generate a control message for indicating to the DAPS handover source base station 920. The RAN controller 950 may generate a control message so that the source base station 920 indicates the terminal 910 to perform a DAPS handover.

In operation S909, the source base station 920 may transmit a handover request message to the target base station 930. The first source base station 720-1 may transmit a handover request message to the first target base station 730-1 through the Xn interface or the X2 interface. According to an embodiment, the handover request message may include a target cell ID. The target cell ID may be identification information of a cell provided by the first target base station 730-1.

In operation S911, the target base station 930 may perform admission control. The target base station 930 may accept the handover request to the target cell indicated by the handover request message of the source base station 920. The target base station 930 may generate RRC reconfiguration information related to the target cell.

In operation S913, the target base station 930 may transmit a handover request confirmation message to the source base station 920. The handover request confirmation message may include RRC reconfiguration information related to the target cell of the target base station 930.

In operation S915, the source base station 920 may transmit a handover configuration to the terminal 910. The handover configuration may include a DAPS configuration. The handover configuration may include at least one cell ID and information required for access to the target cell. The source base station 920 may transmit an RRC reconfiguration message including the handover configuration to the source base station 920. The RRC reconfiguration message may correspond to the handover command of FIG. 5A or 5B.

In operation S917, the terminal 910 may perform DAPS handover with the source base station 920 and the target base station 930. The terminal 910 may maintain the connection with the source base station 920 until the random access to the target base station 930 is successful. The terminal 910 may continue to receive downlink user data from the source base station 920 until the connection with the source base station 920 is released. The terminal 910 may continue to transmit uplink user data to the source base station 920 until a random access procedure for the target base station 930 is successfully performed.

The RAN controller 950 may determine whether to indicate a DAPS handover or a general handover (i.e., a type of handover other than a DAPS handover) according to the type of service provided to the terminal 910. Through the DAPS handover, the terminal 910 may maintain a state of being connected to the two cells even while the handover is in progress. Accordingly, the warning of RLF generation or call-drop may be reduced, and thus a stable service may be provided to the terminal.

Figure 10:
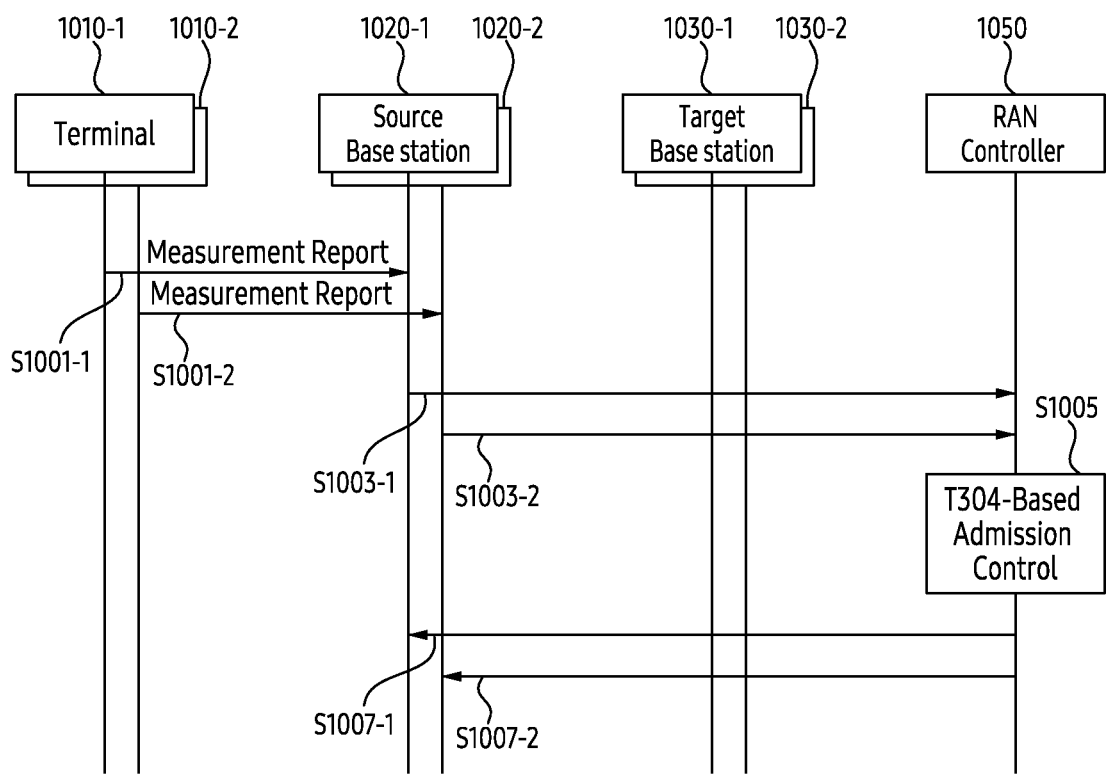
FIG. 10 illustrates signal flows between network entities for admission control using a handover timer, according to an embodiment of the disclosure.

FIG. 10 illustrates signal flows between network entities for admission control using a handover timer, according to an embodiment of the disclosure. The handover timer means a timer started after receiving the handover command. The handover timer may include a T304 timer defined in the 3GPP NR or LTE standard. In a case in which the random access procedure to the target cell is not successful until the timer expires after receiving the handover command, the terminal performs RRE. Although, two terminals (e.g., the first terminal 1010-1 and the second terminal 1010-2), two source base stations (e.g., the first source base station 1020-1 and the second source base station 1020-2), and two target base stations (e.g., the first target base station 1030-1 and the second target base station 1030-2) are described as examples to describe the operation of each terminal in the disclosure, embodiments of the disclosure may also be applied to operations between three or more terminals, three or more base stations, and the RAN controller 1050.

Referring to FIG. 10, in operation S1001-1, the first terminal 1010-1 may transmit a measurement report to the first source base station 1020-1. In operation S1001-2, the second terminal 1010-2 may transmit a measurement report to the second source base station 1020-2. The measurement report may be a measurement report for the eNB of FIG. 5A or a measurement report for the gNB of FIG. 5B.

In operation S1003-1, the first source base station 1020-1 may transmit a report message to the RAN controller 1050. The first source base station 620-1 may receive a measurement report from each terminal served by the first source base station 620-1. In operation S1003-2, the second source base station 1020-2 may transmit a report message to the RAN controller 1050. The second source base station 620-2 may receive a measurement report from each terminal served by the second source base station 620-2.

In operation S1005, the RAN controller 1050 may perform T304-based admission control. The T304-based admission control refers to admission control performed based only on measurement reports within a certain interval (hereinafter, a collection section) among the collected measurement reports. The certain interval may be configured to be shorter than the length of the T304 timer. For example, the RAN controller 1050 may identify candidate cells of a certain terminal based on measurement reports collected during a collection section corresponding to 50% of the length of the T304 timer (e.g., 500 milliseconds (ms)). In other words, the RAN controller 1050 may operate a buffer section for terminals of handover targets. The RAN controller 1050 may identify an optimal cell or an optimal base station to be matched to each UE based on measurement reports collected in the buffer section.

In operation S1007-1, the RAN controller 1050 may transmit a control message to the first source base station 1020-1. The control message may include information on one or more candidate cells of the first terminal 1010-1.

In operation S1007-2, the RAN controller 1050 may transmit a control message to the second source base station 1020-2. The control message may include information on one or more candidate cells of the second terminal 1010-2.

Although not shown in FIG. 10, the RAN controller 1050 may adaptively adjust the collection section. According to an embodiment, the RAN controller 1050 may increase the collection section in order to derive a more accurate result. According to an embodiment, the RAN controller 1050 may reduce the collection period in order to reduce burden of the calculation amount.

In FIGS. 6 to 10, an admission control method by the RAN controller is described. In FIG. 6, optimal cell matching by the RAN controller is described, in FIG. 7, an instruction of a plurality of candidate cells by the RAN controller is described, in FIG. 8, pre-detection of a call-drop by the RAN controller is described, in FIG. 9, a DAPS configuration by the RAN controller is described, and in FIG. 10, T304-based admission control by the RAN controller is described, respectively.

In the control messages described in FIGS. 6 to 10, additional parameters as well as measurement reports may be included to enable effective admission control of the RAN controller. According to an embodiment, the control message may include a cell ID and a terminal ID. In order to recognize a corresponding terminal and a corresponding cell in the RAN controller, a cell ID and a terminal ID may be included.

According to an embodiment, the control message may further include at least one parameter for configuration of a measurement report in a corresponding cell. For example, the control message may include a threshold value (e.g., an RSRP threshold value, an RSRQ threshold value, and an SINR threshold value) of an event occurrence condition. In addition, for example, the control message may include a hysteresis value that is a parameter of the event occurrence condition. For example, the measurement report configuration may include a configuration of the event A3. The entry and exit conditions of Event A3 are as follows.

$$Mn+Ofn+Ocn-Hys > Mp+Ofp+Ocp+Off \quad \text{Equation 1}$$

$$Mn+Ofn+Ocn+Hys < Mp+Ofp+Ocp+Off \quad \text{Equation 1}$$

Mn indicates a measurement result of an adjacent cell without considering the offset. Ofn indicates a measurement target specific offset of a reference signal of a neighboring cell (i.e., offsetMO defined within meansObjectNR corresponding to adjacent cells in the TS 38.331 standard). Ocn is a cell-specific offset (i.e., cellIndividualOffset defined within the measureObjectNR corresponding to the frequency of adjacent cells in the TS 38.331 standard) of the adjacent cell, and is configured to 0 in case that not configured for the adjacent cell. Mp indicates the measurement result of SpCell without considering the offset. Ofp indicates the offset of SpCell for each the measurement target (i.e., offsetMO defined within the meansObjectNR corresponding to SpCell in the TS 38.331 standard). Ocp is a cell-specific offset (i.e., cellIndividualOffset defined within the measureObjectNR corresponding to SpCell in TS 38.331 standard) of SpCell and is configured to 0 if not configured for SpCell. Hys indicates a hysteresis parameter for this event (i.e., hysteresis defined within the reportConfigNR for A3 events in the TS 38.331 standard). Off indicates an offset parameter of this event (i.e., a3-Offset defined within the reportConfigNR for A3 events in the TS 38.331 standard). Mn and Mp are displayed as dBm for RSRP, and displayed as dB for RSRQ and RS-SINR. 'Ofn', 'Ocn', 'Ofp', 'Ocp', 'Hys', and 'Off' are displayed as dB. According to some embodiments, at least one of 'Ofn', 'Ocn', 'Ofp', 'Ocp', 'Hys', or 'Off' among the above-described parameters may be transmitted to the RAN controller through a control message. At least one of Mn or Mp may be transmitted to the RAN controller through a measurement report.

According to an embodiment, the control message may further include at least one parameter related to the service of the terminal. For example, the control message may include bearer information (e.g., a data radio bearer (DRB) ID (identifier)) of the terminal. For example, the control message may include quality of service (QoS) flow information (e.g., QoS ID). For example, the control message may include a protocol data unit (PDU) session ID. For example, the control message may include an S-NSSAI.

According to an embodiment, the control message may include a parameter related to throughput. For example, the control message may include modulation and coding scheme (MCS) information or channel quality indicator (CQI). In addition, for example, the control message may include information on the resource amount (e.g., the number of RBs) allocated for the terminal.

The RAN controller according to embodiments of the disclosure may calculate a per-cell metric for a specific terminal based on the above-described parameters in order to match an appropriate cell with the terminal.

Figure 11:
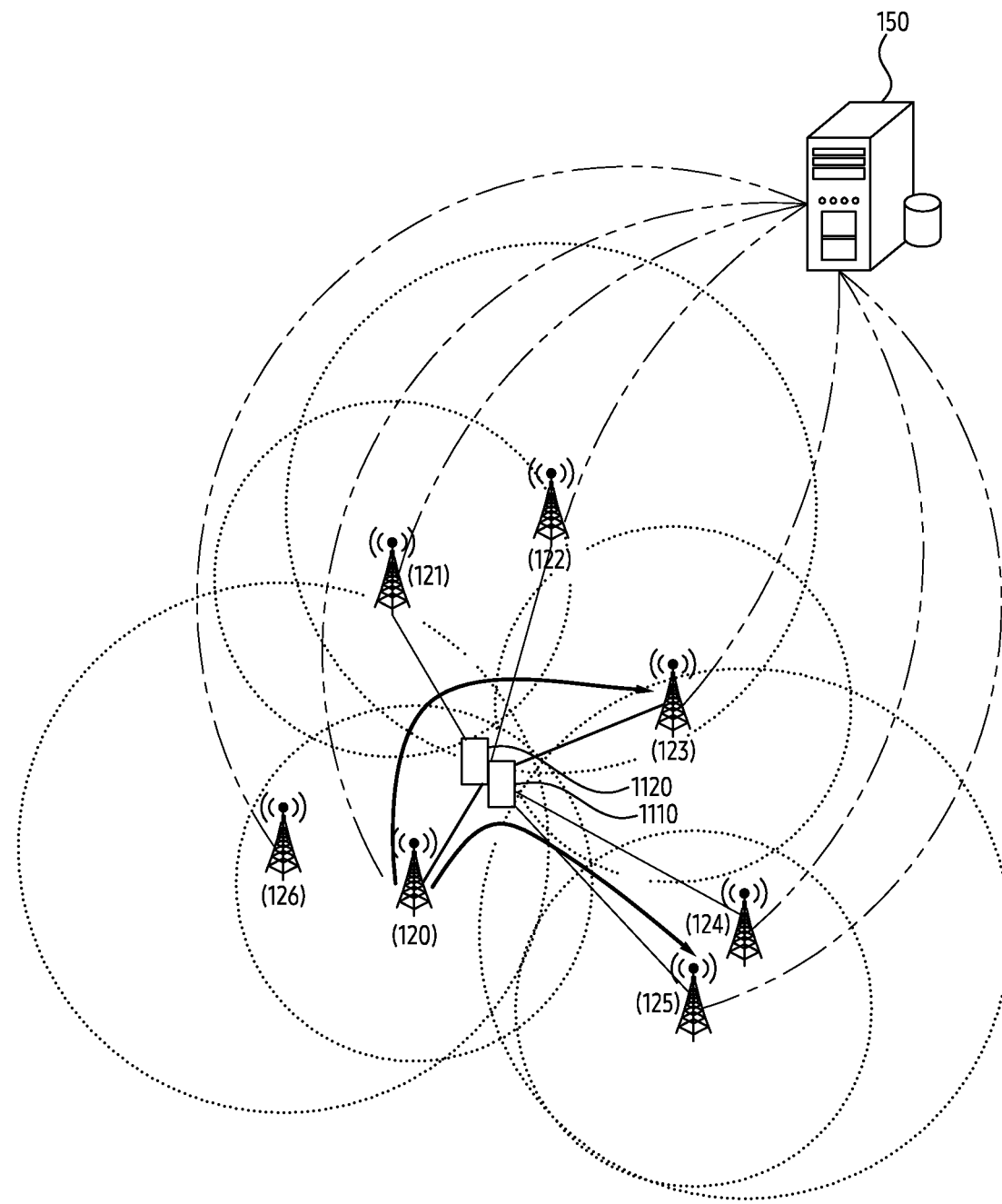
FIG. 11 illustrates an example of admission control for each service, according to an embodiment of the disclosure.

FIG. 11 illustrates an example of admission control for each service, according to an embodiment of the disclosure. The wireless communication environment may include a first base station 120, a second base station 121, a third base station 122, a fourth base station 123, a fifth base station 124, a sixth base station 125, and a seventh base station 126. The RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126. Although FIG. 11 illustrates that each base station provides one cell, embodiments of the disclosure are not limited thereto. Of course, one base station can provide a plurality of cells.

Referring to FIG. 11, the serving base station of the first terminal 1110 may be the first base station 120. The first terminal 1110 may measure cell quality of each of the serving cell and neighboring cells. The first terminal 1110 may transmit a measurement report including a measurement result to the first base station 120, which is a serving base station. The first base station 120, which is the serving base station, may identify that the channel quality (e.g., RSRP or RSRQ) of the cell of the fourth base station 123 is the highest among adjacent cells of the first terminal. The serving base station of the second terminal 1120 may be the first base station 120. The second terminal 1120 may measure cell quality of each of the serving cell and neighboring cells. The second terminal 1120 may transmit a measurement report including a measurement result to the first base station 120, which is a serving base station. The serving base station may identify that the channel quality (e.g., RSRP or RSRQ) of the cell of the fourth base station 123 is the highest among adjacent cells of the first terminal.

The service in progress in the first terminal 1110 may be a voice call. The service in progress in the second terminal 1120 may be a high definition (HD) video call. In a case in which the cells are matched based on the channel quality, both the first terminal 1110 and the second terminal 1120 may perform handover to the fourth base station 123. However, the fourth base station 123 may be burdened or radio resources of other base stations may be wasted. The RAN controller 150 according to embodiments of the disclosure may collect channel states of other adjacent cells and services and requirements in progress in the individual terminals to reduce waste of radio resources and provide efficient services to terminals.

According to an embodiment, the RAN controller 150 may match the first terminal 1110 with the cell of the sixth base station 125 that meets the requirements of the voice call. The RAN controller 150 may transmit a control message indicating a connection relationship between the first terminal 1110 and the cells of the sixth base station 125 to the first base station 120. The RAN controller 150 may match the second terminal 1120 with a cell of the fourth base station 123 having the highest channel quality. The RAN controller 150 may transmit a control message indicating a connection relationship between the second terminal 1120 and the cells of the fourth base station 123.

Figure 12:
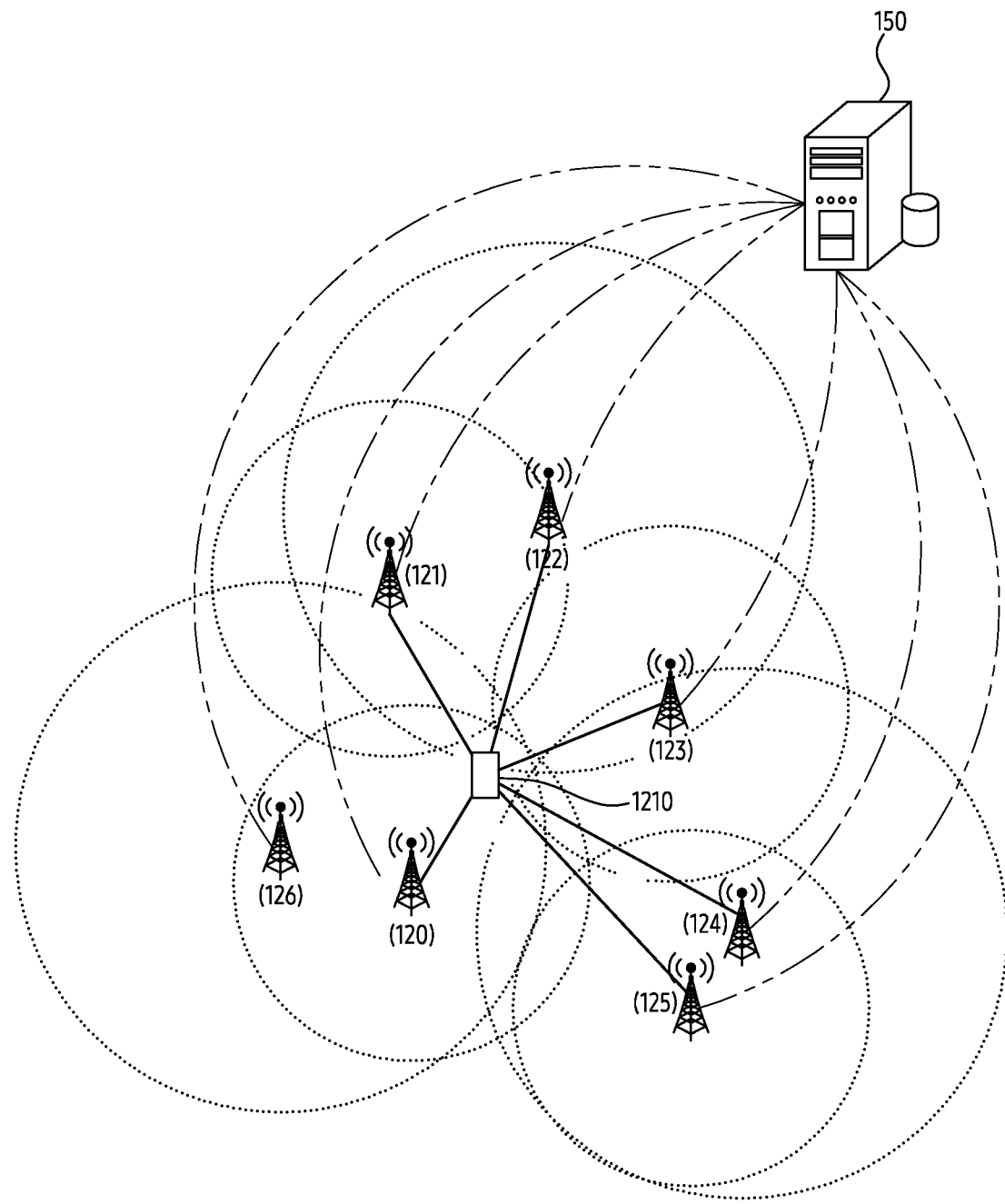
FIG. 12 illustrates an example of a handover according to received signal quality, according to an embodiment of the disclosure.

FIG. 12 illustrates an example of a handover according to received signal quality, according to an embodiment of the disclosure.

Figure 13:
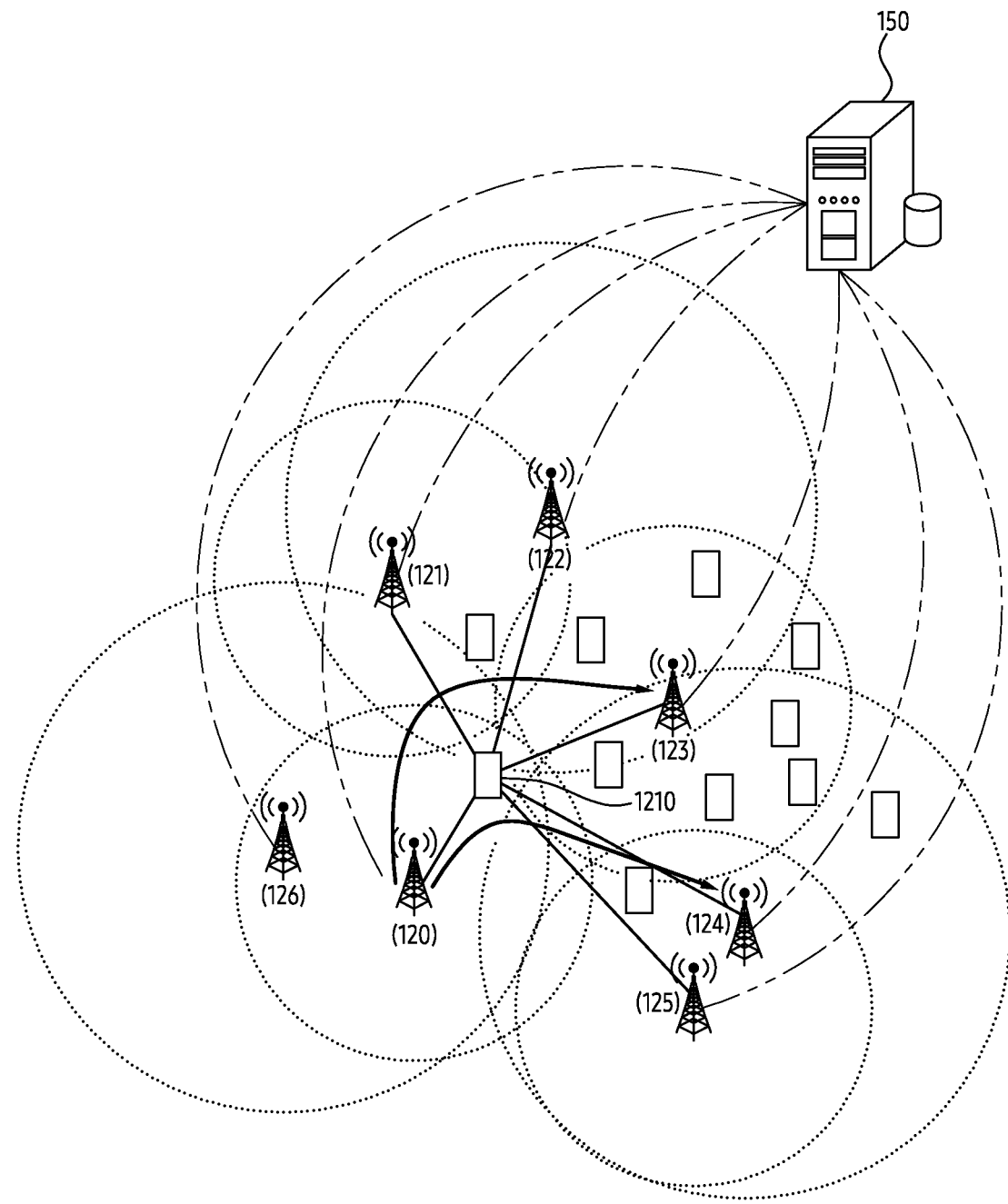
FIG. 13 illustrates an example of a handover according to resource usage, according to an embodiment of the disclosure.

FIG. 13 illustrates an example of a handover according to resource usage, according to an embodiment of the disclosure.

The wireless communication environment may include a first base station 120, a second base station 121, a third base station 122, a fourth base station 123, a fifth base station 124, a sixth base station 125, and a seventh base station 126. The RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126. Although FIG. 12 illustrates that each base station provides one cell, embodiments of the disclosure are not limited thereto. Of course, one base station can provide a plurality of cells.

Referring to FIG. 12, the serving base station of the terminal 1210 may be the first base station 120. The terminal 1210 may measure cell quality of each of the serving cell and neighboring cells. The terminal 1210 may transmit a measurement report including a measurement result to the first base station 120, which is the serving base station. The first base station 120, which is the serving base station, may identify that the channel quality (e.g., RSRP or RSRQ) of the cell of the fourth base station 123 is the highest among adjacent cells of the terminal. However, in the fourth base station 123, it may not be easy to provide cell access for the terminal 1210. For example, since the number of terminals connected to the fourth base station 123 is large, the resource amount to be allocated to the terminal 1210 may not be sufficient.

Referring to FIG. 13, multiple terminals may be located in the cell coverage of the fourth base station 123. The first base station 120 may transmit a handover command to the cell of the fourth base station 123 to the terminal 1210. However, it may not be easy to allocate a resource of a sufficient size to the terminal 1210 in the fourth base station 123. It is difficult to expect a sufficient data speed to the terminal 1210.

According to an embodiment, the RAN controller 150 may identify a candidate cell for the terminal 1210 based on a resource situation as well as a signal strength. The RAN controller 150 may identify a cell of the fifth base station 124. Even in a case in which the channel quality of the fifth base station 124 is lower than the channel quality of the cell of the fourth base station 123, throughput of the fifth base station 124 may be lower than the throughput of the fourth base station 123. For example, the RAN controller 150 may determine that the cell of the fifth base station 124 is more suitable for the terminal 1210, depending on the physical resource block (PRB) usage of the cell or load situation. The RAN controller 150 may match the terminal 1210 with a cell of the fifth base station 124. The RAN controller 150 may transmit a control message indicating a connection relationship between the first terminal 1110 and the fifth base station 124 to the first base station 120.

Figure 14:
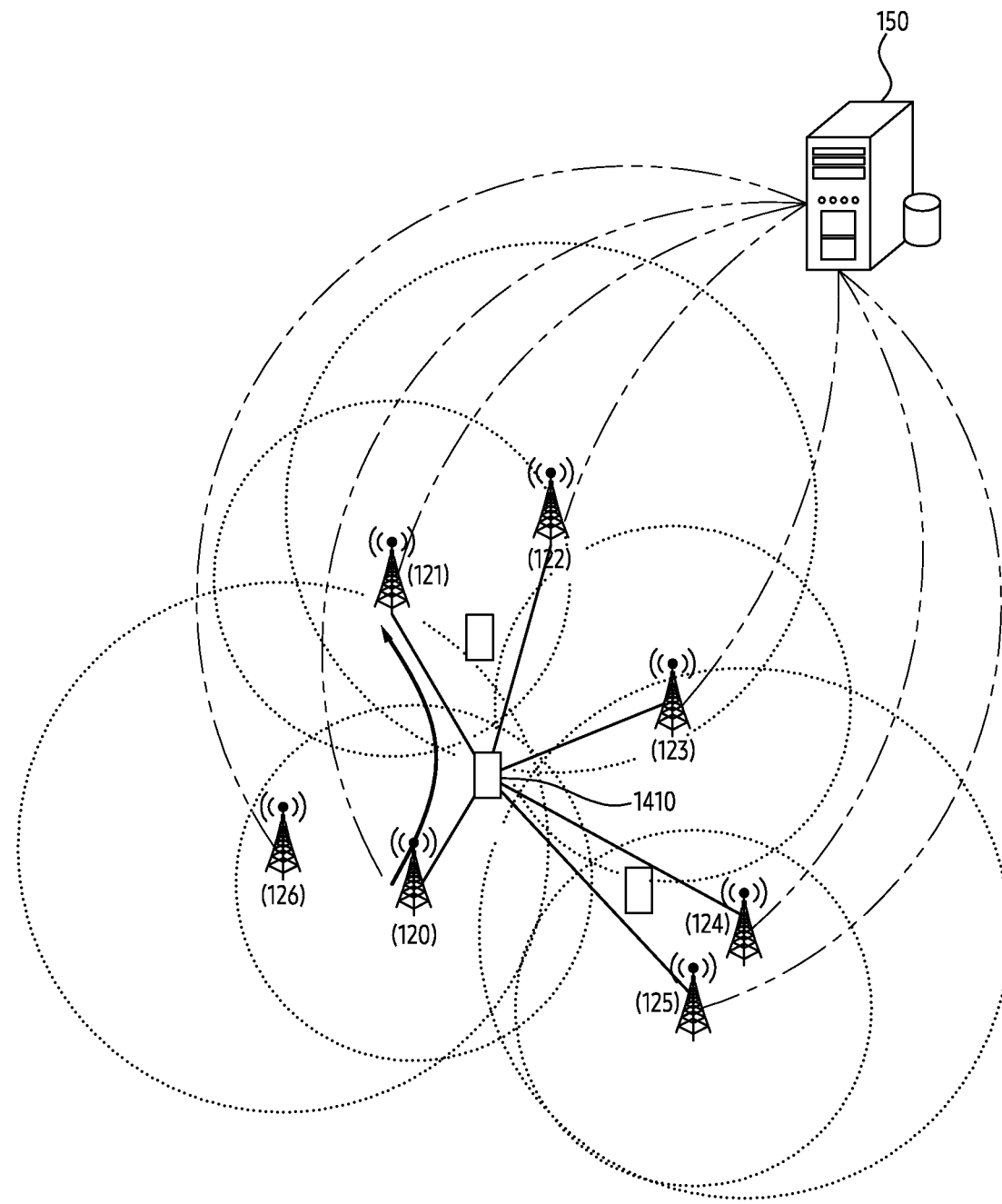
FIG. 14 illustrates an example of a handover according to pre-detection of a call-drop, according to an embodiment of the disclosure.

FIG. 14 illustrates an example of a handover according to pre-detection of a call-drop, according to an embodiment of the disclosure. The wireless communication environment may include a first base station 120, a second base station 121, a third base station 122, a fourth base station 123, a fifth base station 124, a sixth base station 125, and a seventh base station 126. The RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126.

Referring to FIG. 14, the serving base station of the terminal 1410 may be the first base station 120. The terminal 1410 may measure cell quality of each of the serving cell and neighboring cells. The terminal 1410 may transmit a measurement report including a measurement result to the first base station 120, which is the serving base station. For example, when a specific event occurs, the terminal 1410 may transmit a measurement report to the first base station 120, which is a serving base station. For example, the terminal 1410 may periodically transmit a measurement report to the first base station 120, which is a serving base station.

In order to reduce the occurrence of call-drop, the RAN controller 150 may transmit configuration information for pre-detection of call-drop to each base station in advance. The configuration information may include at least one of a condition for detecting an event of a call-drop or a base station configuration based on the event detection of a call-drop. The first base station 120 may monitor a terminal connected to the first base station 120 based on the control of the RAN controller 150. According to an embodiment, the first base station 120 may identify a terminal (e.g., the terminal 1410) that is expected to be RLF or call-drop based on measurement reports of terminals connected to the first base station 120 and configuration information of the RAN controller 150. The first base station 120 may transmit a handover command to the terminal 1410 even in a case in which the control message of the RAN controller 150 is not received. The handover command may indicate to a neighboring cell included in the measurement report of the terminal 1410. The throughput may increase in the control area of the RAN controller 150 by reducing the possibility of the terminal 1410 entering the idle state due to RLF or call-drop. The throughput may increase in the control area of the RAN controller 150. In addition, the terminal 1410 may receive or transmit data without disconnection.

Figure 15:
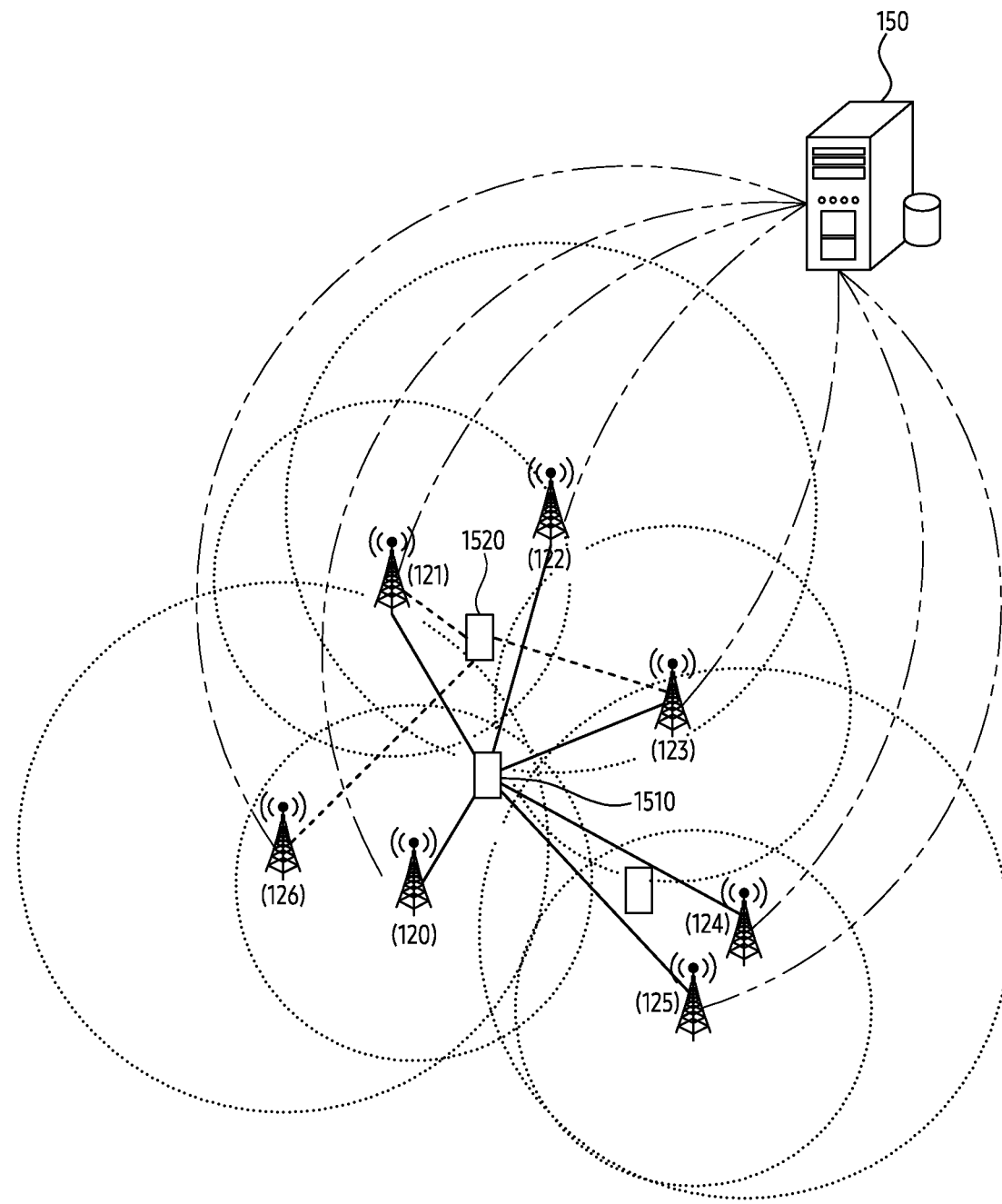
FIG. 15 illustrates an example of candidate cell-based admission control according to an embodiment of the disclosure.

FIG. 15 illustrates an example of candidate cell-based admission control according to an embodiment of the disclosure. The wireless communication environment may include a first base station 120, a second base station 121, a third base station 122, a fourth base station 123, a fifth base station 124, a sixth base station 125, and a seventh base station 126. The RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126.

Referring to FIG. 15, the serving base station of the first terminal 1510 may be the first base station 120. The first terminal 1510 may measure cell quality of each of the serving cell and neighboring cells. The first terminal 1510 may transmit a measurement report including a measurement result to the first base station 120, which is a serving base station. The serving base station of the second terminal 1520 may be the first base station 120. The second terminal 1520 may measure cell quality of each of the serving cell and neighboring cells. The second terminal 1520 may transmit a measurement report including a measurement result to the first base station 120, which is the serving base station.

The RAN controller 150 may determine the priority of neighboring cells of the first terminal 1510. For example, the RAN controller 150 may identify candidate cells for the first terminal 1510 in the order of cells of the second base station 121, cells of the third base station 122, cells of the first base station 120, cells of the fifth base station 124, and cells of the sixth base station 125. The priority of the second base station 121 may be the highest. The RAN controller 150 may transmit a control message indicating handover to a cell of the second base station 121 to the first base station 120.

The RAN controller 150 may determine the priority of neighboring cells of the second terminal 1520. For example, the RAN controller 150 may identify candidate cells for the second terminal 1520 in the order of cells of the second base station 121, cells of the fourth base station 123, and cells of the seventh base station 126. The RAN controller 150 may transmit a control message indicating handover to the cell of the second base station 121 to the first base station 120. In this case, as illustrated in FIG. 13, in a case in which throughput of the second base station 121 is large, the connection of the first terminal 1510 or the second terminal 1520 to the cell of the second base station 121 may fail. For example, in a case in which the connection of the first terminal 1510 fails, the first terminal 1510 performs an RRE procedure to recover the failed connection. The first terminal 1510 may perform cell reselection again.

To solve the above-described problem, the control message of the RAN controller 150 according to embodiments of the disclosure may indicate not only one candidate cell but also a plurality of candidate cells. According to an embodiment, the RAN controller 150 may transmit a control message for indicating to candidate cells (e.g., a cell of the second base station 121, a cell of the third base station 122, a cell of the first base station 120, a cell of the fifth base station 124, and a cell of the sixth base station 125) of the first terminal 1510 to the first base station 120. According to an embodiment, the RAN controller 150 may transmit a control message for indicating candidate cells (e.g., candidate cells for the second terminal 1520 in the order of a cell of the second base station 121, a cell of the fourth base station 123, and a cell of the seventh base station 126) of the second terminal 1520 to the first base station 120. For example, even in a case in which the cell connection of the second base station 121 fails, the first terminal 1510 performs the cell connection of the third base station 122 without cell reselection. The first terminal 1510 may perform a random access procedure with a cell of the third base station 122.

Figure 16:
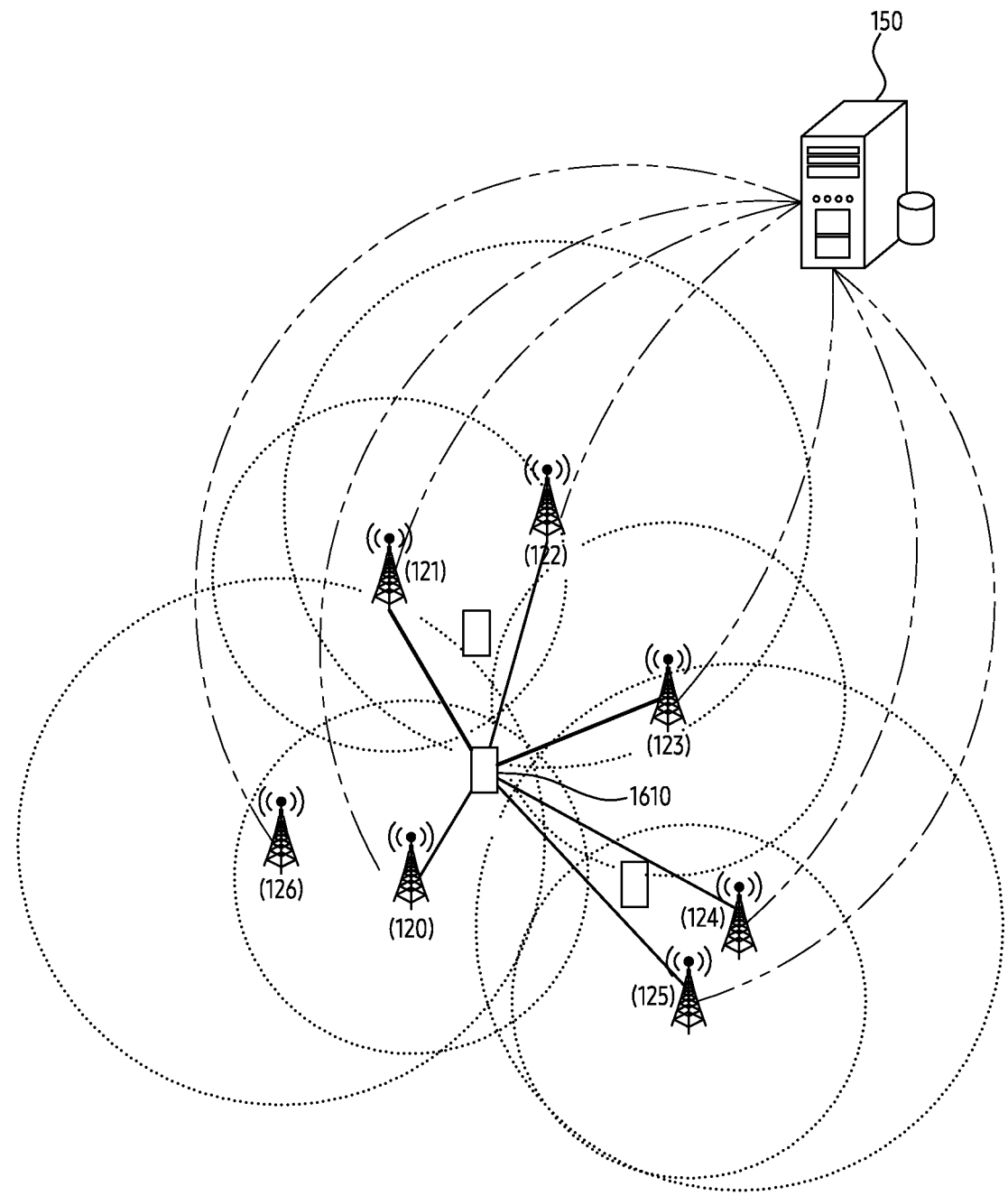
FIG. 16 illustrates an example of a candidate cell-based handover according to an embodiment of the disclosure.

FIG. 16 illustrates an example of a candidate cell-based handover according to an embodiment of the disclosure. The wireless communication environment may include a first base station 120, a second base station 121, a third base station 122, a fourth base station 123, a fifth base station 124, a sixth base station 125, and a seventh base station 126. The RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126.

Referring to FIG. 16, the serving base station of the terminal 1610 may be the first base station 120. The terminal 1610 may measure cell quality of each of the serving cell and neighboring cells. The terminal 1610 may transmit a measurement report including a measurement result to the first base station 120, which the serving base station.

For candidate cell-based handover, the RAN controller 150 may provide information on candidate cells (e.g., a cell of the second base station 121 and a cell of the fourth base station 123) of the terminal 1610 to the first base station 120, which is a serving base station. The first base station 120 may transmit an RRC message (e.g., an RRC reconfiguration message) including a handover command to the terminal 1610. According to an embodiment, the RRC message may include identification information on candidate cells of the terminal 1610, which is handover target. The RRC message may include information on at least two candidate cells among the candidate cells indicated by the RAN controller 150. Therefore, even in a case in which the connection to the target cell with the highest priority among the at least two candidate cells fails, the terminal 1610 may attempt to immediately access the candidate cell with the next priority.

Figure 17:
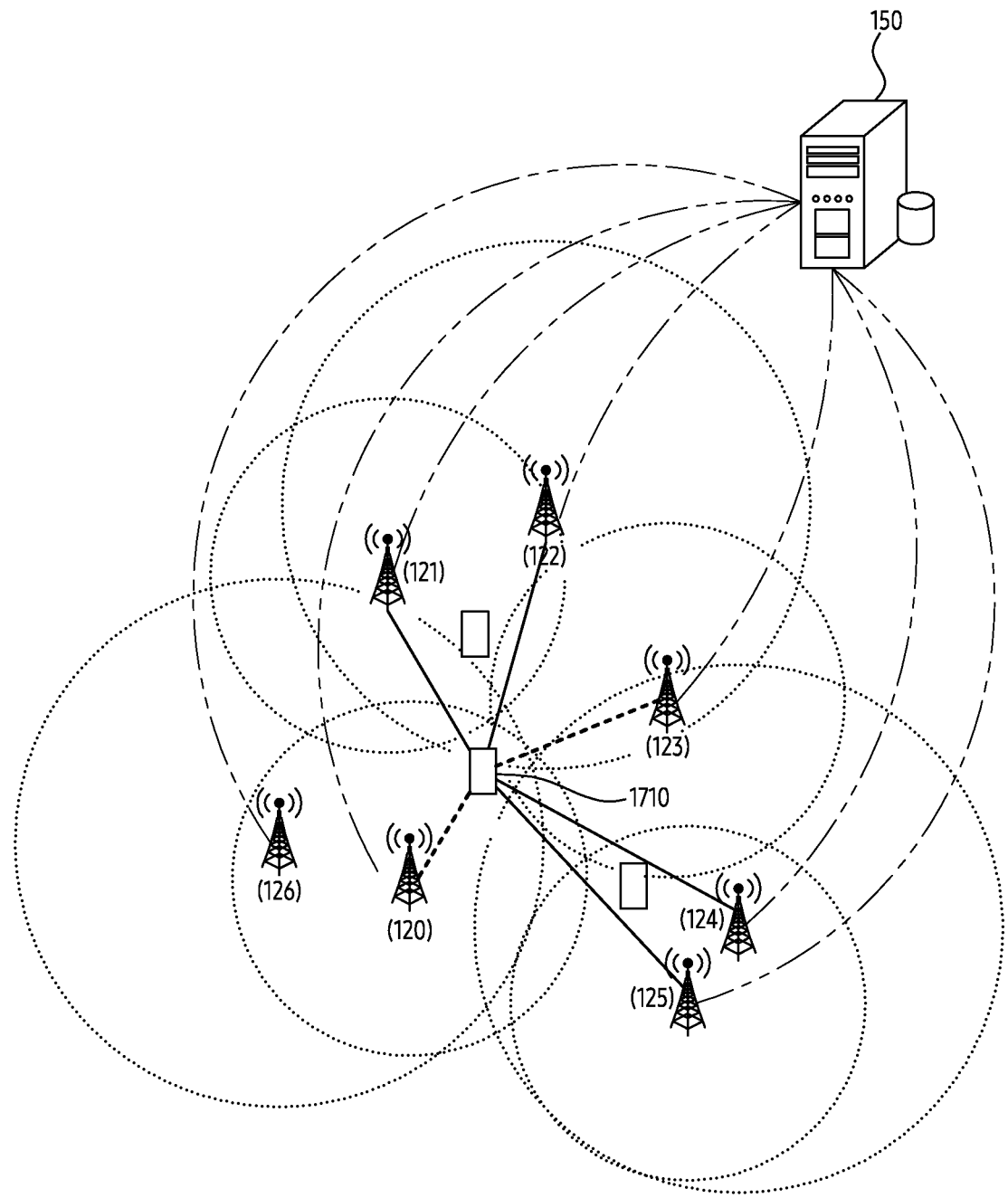
FIG. 17 illustrates an example of a DAPS handover according to an embodiment of the disclosure.

FIG. 17 illustrates an example of a DAPS handover according to an embodiment of the disclosure. A wireless communication environment may include a first base station 120, a second base station 121, a third base station 122, a fourth base station 123, a fifth base station 124, a sixth base station 125, and a seventh base station 126. A RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126.

Referring to FIG. 17, a serving base station of a terminal 1710 may be the first base station 120. The terminal 1710 may measure cell quality of each of a serving cell and neighboring cells. The terminal 1710 may transmit a measurement report including a measurement result to the first base station 120, which is the serving base station. The first base station 120, which is the serving base station, may identify that a channel quality (e.g., RSRP or RSRQ) of a cell of the fourth base station 123 is the highest among adjacent cells of the terminal.

The RAN controller 150 may identify a service in progress in the terminal 1710. According to an embodiment, with respect to a terminal in which a service such as URLLC is in progress, the RAN controller 150 may operate in a delay priority mode. When operating in the delay priority mode, the RAN controller 150 may switch a handover mode of the terminal from regular handover to the DAPS handover. The RAN controller 150 may transmit a control message including a DAPS configuration to the first base station 120. The first base station 120 may transmit a handover command to the cell of the fourth base station 123 to the terminal 1710. The handover command may indicate the DAPS handover. The terminal in which the DAPS handover is initiated may be connected to both a source base station and a target base station during the handover in progress. Accordingly, the terminal may transmit or receive data on a network without service delay.

Figure 18:
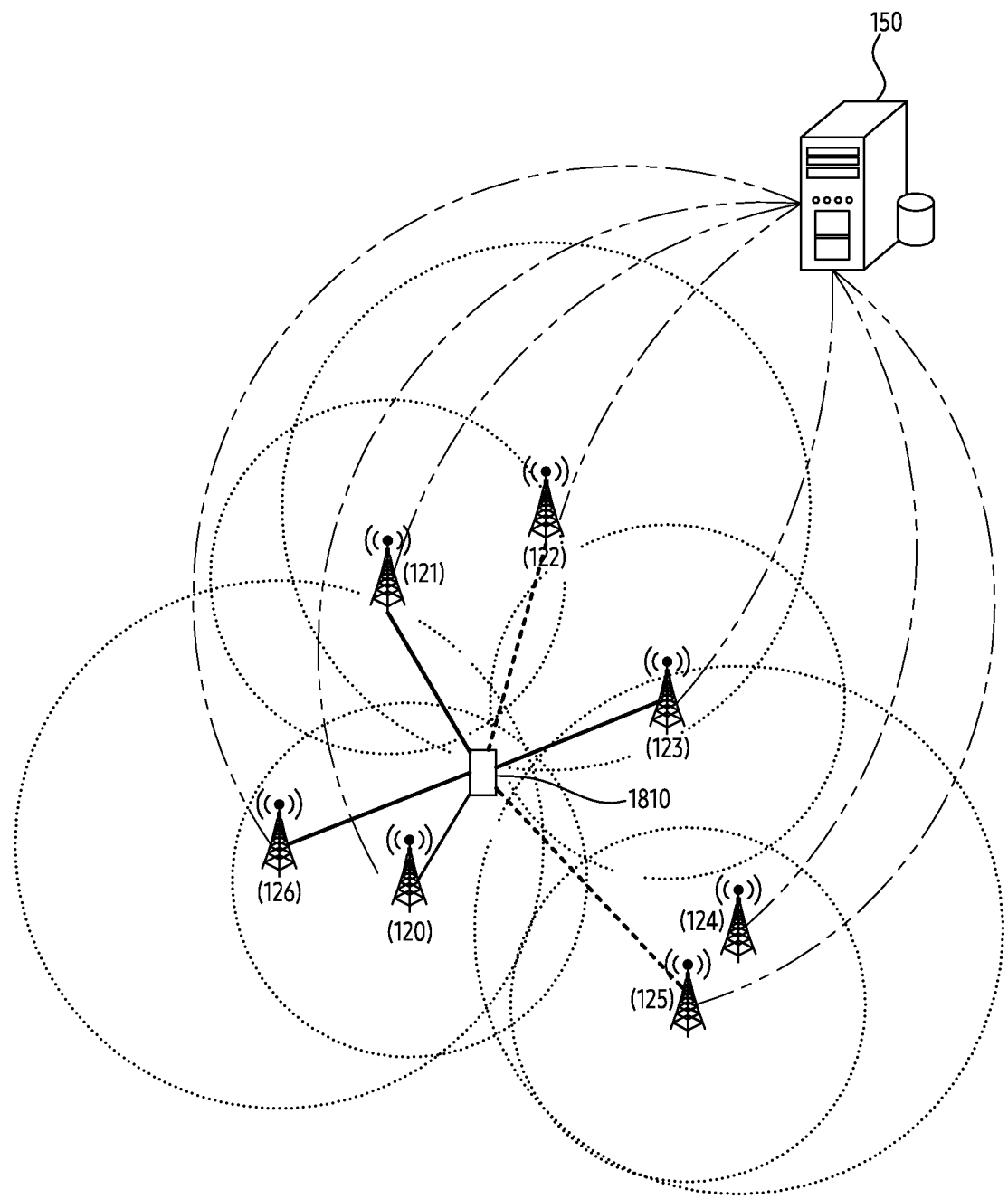
FIG. 18 illustrates an example of admission control using a handover timer according to an embodiment of the disclosure.

FIG. 18 illustrates an example of admission control using a handover timer according to an embodiment of the disclosure. The handover timer may include a T304 timer defined in 3GPP NR or LTE standard. After receiving a handover command, in a case in which a random access procedure to a target cell does not succeed until the timer expires, a terminal performs RRE. A wireless communication environment may include a first base station 120, a second base station 121, a third base station 122, a fourth base station 123, a fifth base station 124, a sixth base station 125, and a seventh base station 126. A RAN controller 150 may be a device for controlling RAN elements and resources through data collection and operations. The RAN controller 150 may be connected to the first base station 120, the second base station 121, the third base station 122, the fourth base station 123, the fifth base station 124, the sixth base station 125, and the seventh base station 126.

Referring to FIG. 18, a serving base station of a terminal 1810 may be the first base station 120. The terminal 1810 may measure cell quality of each of a serving cell and neighboring cells. The terminal 1810 may transmit a measurement report including a measurement result to the first base station 120, which is the serving base station. The RAN controller 150 may receive a control message including the measurement report from each of the first base station 120, the second base station 121, the third base station 122, the fourth base station 123, the fifth base station 124, the sixth base station 125, and the seventh base station 126.

The RAN controller 150 may analyze the control messages. The RAN controller 150 may treat only the measurement reports within a certain section in order to match an applicable cell to the terminal 1810. The RAN controller 150 may configure a buffer section in order to identify the measurement reports required for the terminal 1810 among multiple measurement reports. According to an embodiment, the buffer period may be configured based on a length (e.g., 1 second) of the T304 timer. For example, the buffer period may be configured as a certain ratio (e.g., 50%) of the length of the T304 timer. For another example, the buffer period may be configured to have the length reduced by a certain time from the length of the T304 timer.

The RAN controller 150 may perform cell matching for each terminal based on the measurement report of the terminals collected within the buffer period. According to an embodiment, the buffer period may start when a report message including the measurement report of a corresponding terminal arrives for the first time. The RAN controller 150 may operate the buffer period for each terminal. When multiple report messages are received, the RAN controller 150 may use a window. The RAN controller 150 may provide a result of the cell matching for each terminal to the each serving base station. Access to a cell for which matching has been completed may be released.

The RAN controller 150 may receive the measurement reports of the terminal 1810. The RAN controller 150 may receive the report messages from the first base station 120. For example, the RAN controller 150 may receive the report message including the measurement report of a cell of the second base station 121 at 400 ms (milliseconds) after the start of the buffer period. For example, the RAN controller 150 may receive the report message including the measurement report of a cell of the third base station 122 at 700 ms after the start of the buffer period. For example, the RAN controller 150 may receive the report message including the measurement report of a cell of the fourth base station 123 at 1500 ms after the start of the buffer period. For example, the RAN controller 150 may receive the report message including the measurement report of a cell of the sixth base station 125 at 1300 ms after the start of the buffer period. For example, the RAN controller 150 may receive the report message including the measurement report of a cell of the seventh base station 126 at 250 ms after the start of the buffer period. The RAN controller 150 may perform the cell matching only for the measurement reports entered within the buffer period. For example, in case that the buffer period is 500 ms, the RAN controller 150 may identify the cell of the second base station 121, the cell of the fourth base station 123, and the cell of the seventh base station 126 as a candidate cell of the terminal 1810.

Figure 19:
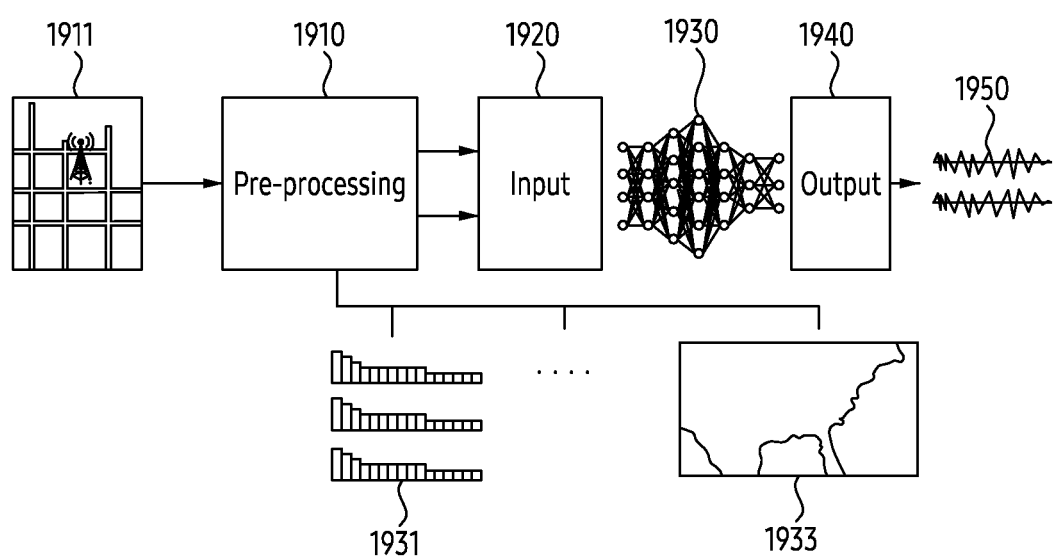
FIG. 19 illustrates an example of machine learning for a cell matching for each UE according to an embodiment of the disclosure.

FIG. 19 illustrates an example of machine learning for a cell matching for each UE according to an embodiment of the disclosure. Machine learning refers to a technique of artificial intelligence for teaching a machine through data and obtaining output according to input based on learned models. Cell matching for each UE may be performed by the RAN controller. According to an embodiment, the RAN controller may be a Near-RT RIC. According to another embodiment, the RAN controller may be a non-RT RIC.

In the disclosure, upon receiving a control message from the RAN controller 150, embodiments to perform handover based on cell information included in the control message have been described. However, embodiments of the disclosure are not limited thereto. According to one embodiment, the serving base station may additionally determine whether to accept the control message received from the RAN controller 150. For example, based on the measurement report(s) collected by the serving base station, when it is determined that the cell indicated by the cell information in the control message is a cell that is not suitable for the UE, the serving base station may determine not to accept the control message. The terminal may transmit a measurement report including measurement quality of a neighboring cell to the serving base station. If the quality of the neighboring cell reported by the terminal is lower than the threshold value, the serving base station may reject handover to the neighboring cell. For another example, based on the capability of the terminal, when it is determined that the cell indicated by the cell information in the control message is a cell that is not suitable for the UE, the serving base station may determine not to accept the control message. The UE may support a specific function (e.g., dual adaptive protocol stack (DAPS) handover (HO) introduced in Release 16, conditional HO (CHO), non-terrestrial network (NTN) introduced in Release 17, etc.) and a cell indicated by the cell information of the control message may not support the specific function. If the RAN controller 150 does not recognize whether or not the UE can access the specific cell, the serving base station may determine whether the UE can access the specific cell with the specific function. Thereafter, when the specific cell indicated by the cell information of the control message does not support the function, the serving base station may reject handover to the specific cell.

Referring to FIG. 19, the RAN controller may collect data for machine learning. The RAN controller may collect UE state information 1911, cell-statistical information 1931, and topology information 1933. The UE state information may be UE-specific information such as a service provided to the terminal, a channel state of the terminal, or a type of the terminal. The cell-statistical information 1931 may be cell-specific information such as quality of a cell, quality of beams provided from the cell, number of connections to the cell, and a type of the cell. The topology information 1933 may refer to geographic information such as a physical connection of base stations, a location where the base station is disposed, and an arrangement scenario of the base station.

The RAN controller may perform pre-processing 1910. The RAN controller may identify at least part of the collected information. The RAN controller may perform sampling. The RAN controller may perform sampling on the UE state information 1911, the cell-statistical information 1931, and the topology information 1933. The RAN controller may provide the sampled data as an input 1920 to the neural network model 1930 for machine learning. The RAN controller may obtain an output 1940 of the neural network model 1930. The RAN controller and one or more base stations may be connected. Each base station may serve one or more terminals. Based on the neural network model 1930, the RAN controller may match an optimal cell for each of the terminals transmitting the measurement report as the output 1940. The RAN controller may obtain the matching table 1950 from the neural network model 1930. The matching table 1950 may include a candidate cell list corresponding to each terminal among the terminals transmitting the measurement report.

Figure 20:
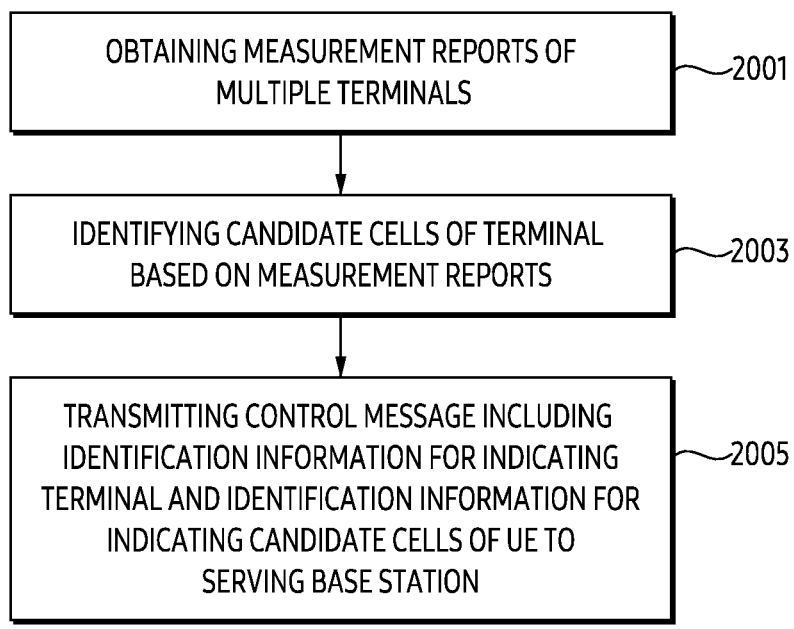
FIG. 20 illustrates an operation flow of a RAN controller for a candidate cell-based handover according to an embodiment of the disclosure.

FIG. 20 illustrates an operation flow of a RAN controller for a candidate cell-based handover according to an embodiment of the disclosure. The RAN controller illustrates the RAN controller 650 of FIG. 6, the RAN controller 750 of FIG. 7, the RAN controller 850 of FIG. 8, the RAN controller 950, or the RAN controller 1050 of FIG. 10.

Referring to FIG. 20, in operation S2001, the RAN controller may obtain measurement reports of a plurality of terminals. The RAN controller may receive a report message from the serving base station of the first terminal. The report message may include a measurement report of each terminal of the serving base station of the first terminal. The RAN controller may receive a report message from the serving base station of the second terminal. The report message may include a measurement report of each terminal of the serving base station of the second terminal.

In operation S2003, the RAN controller may identify candidate cells of the terminal based on measurement reports. The RAN controller may perform admission control. The RAN controller may identify candidate cells of the terminal based on the cell included in each measurement report and the channel quality (e.g., RSRP) for each cell. The candidate cell refers to a cell determined to be suitable for supporting a service being provided to the terminal among a serving cell of the terminal and neighboring cells. The RAN controller may identify a plurality of candidate cells. The RAN controller may calculate a metric related to the service of the terminal for each cell. The RAN controller may identify a plurality of candidate cells having a high priority based on the calculated metrics. For example, the RAN controller may identify the first cell having the highest priority, the second cell having the next priority after the first cell, and the third cell having the next priority after the second cell, among the serving cell of the terminal and neighboring cells.

In operation S2005, the RAN controller may transmit a control message including identification information for indicating the terminal and identification information for indicating candidate cells of the terminal to the serving base station. The RAN controller may include identification information for indicating the terminal in order to indicate which terminal the handover indicated by the control message is for. According to an embodiment, the identification information for indicating the terminal may include GUTI of the terminal or TMSI of the terminal. The RAN controller may include identification information for indicating candidate cells in order to indicate which target cell the handover indicated by the control message indicates. The identification information for indicating the candidate cells may include an ID for each candidate cell. According to an embodiment, the ID of the candidate cell may be an E-UTRA CGI (cell global identifier) or NR CGI.

Figure 21:
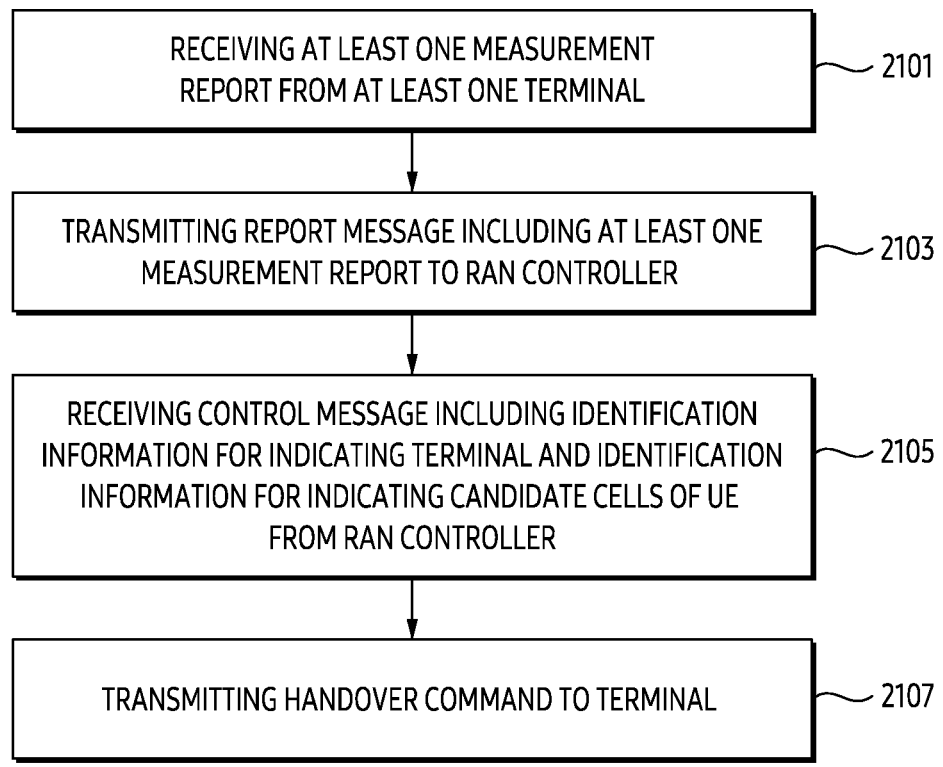
FIG. 21 illustrates an operation flow of a base station for a candidate cell-based handover according to an embodiment of the disclosure.

FIG. 21 illustrates an operation flow of a base station for a candidate cell-based handover according to an embodiment of the disclosure. The base station illustrates the first source base station 620-1 of FIG. 6, the first source base station 720-1 of FIG. 7, the first source base station 820-1 of FIG. 8, the source base station 920 of FIG. 9, and the first source base station 1020-1 of FIG. 10.

Referring to FIG. 21, in operation S2101, the base station may receive at least one measurement report from at least one terminal. The base station may receive a measurement report from a terminal connected to the base station. The terminal may measure channel quality for the serving cell of the terminal and neighboring cells. The terminal may generate a measurement report including identification information of the cell and channel quality of the corresponding cell. The terminal may transmit a measurement report to the base station periodically or when an event occurs. The base station may receive a measurement result of the terminal from the terminal. The measurement result may include a cell and a channel quality for the cell. The channel quality for a cell may include at least one of cell quality and beam quality.

In operation S2103, the base station may transmit a report message including at least one measurement report to the RAN controller. The base station may collect a measurement report for each of the terminals connected to the base station. The base station may include the collected measurement reports in the report message. According to an embodiment, the report message may include cell identification information and measurement report of each terminal in the cell of the cell identification information. According to an embodiment, the report message may include terminal identification information and measurement report corresponding to the terminal identification information. According to an embodiment, the report message may include terminal identification information and service information related to the terminal of the terminal identification information. For example, the service information may include a data radio bearer (DRB) ID (identifier). For example, the service information may include a quality of service (QoS) flow ID. For example, the service information may include a protocol data unit (PDU) session ID. For example, the service information may include an S-NSSAI.

In operation S2105, the base station may receive a control message including identification information for indicating the terminal and identification information for indicating candidate cells of the terminal from the RAN controller. According to an embodiment, the identification information for indicating the terminal may include GUTI of the terminal or TMSI of the terminal. According to an embodiment, the ID of the candidate cell may be an E-UTRA CGI (cell global identifier) or NR CGI.

In operation S2107, the base station may transmit a handover command to the terminal. The base station may generate an RRC reconfiguration message indicating a plurality of candidate cells based on information on the candidate cells received in operation S2105. In order that the connection to the second cell with the highest priority after the first cell is immediately attempted, even in a case in which the connection to the first cell with the highest priority among the plurality of candidate cells fails, the base station may include information on a plurality of candidate cells in the handover command. The base station may include information on a plurality of candidate cells and transmit an RRC reconfiguration message indicating a handover to the terminal. According to an embodiment, in the NR communication system, the base station may transmit an RRC reconfiguration message including the reconfigurationWithsync IE to the terminal. According to an embodiment, in the LTE communication system, the base station may transmit an RRC Connection Reconfiguration message including MobilityConfigInfo IE to the terminal.

In a conventional network system, when an event occurs, interworking between terminals and cells is performed in a candidate group. However, these connections considered the applicable ranking of surrounding cells, not the optimal linkage considering the entire surrounding cells. As the number of cells serving the terminal increases, a larger number of cells is required to be reviewed when connecting the terminal and the cell. In embodiments of the disclosure, optimal cell matching may be achieved by collecting measurement reports for multiple cells through a RAN controller connected to each base station and linking the UE and the cells based on the collected measurement reports. Each terminal may be connected with an applicable cell regardless of signal strength in order to maintain a service state. In preparation for the connection failure of the terminal to the target cell, the RAN controller may transmit information on the rear order cell together. When performing handover, it is possible to quickly switch to the next handover cell instead of call-drop by generating and transmitting a candidate list for the target base station. In addition, the RAN controller may achieve optimization of usage in the designated area through service level matching between the terminal and the base station. For example, the designated area may be a tracking area (TA). During a tracking area update (TAU), throughput performance may be improved at an average and cell edge through cell matching for each service grade of a terminal for cells/base stations related to a TA.

According to embodiments, a method performed by a radio access network (RAN) controller connected to base stations may comprise obtaining measurement reports of a plurality of user equipment (UE)s. Each measurement report of the measurement reports may include a measurement result per cell of a corresponding UE. The method may comprise identifying candidate cells of a UE among the plurality of UEs, based on the measurement reports. The method may comprise transmitting, to a serving base station for the UE, a control message including identification information for indicating the UE and identification information for indicating the candidate cells of the UE. The control message may indicate a handover priority of each cell of the candidate cells. The candidate cells include a first cell for access and a second cell for access to be performed in response to a failure of the access to the first cell. In other words, the candidate cells may include a first cell and a second cell for handover initiated in response to a connection failure to the first cell.

In an embodiment, the handover may be performed without cell reselection after the connection failure to the first cell. In other words, the handover is performed after the failure of the access while maintaining a radio resource control (RRC) connection state.

In an embodiment, the access to the second cell is initiated before an expiry of a timer for a radio resource control (RRC) re-establishment. The timer is started by a RRC reconfiguration message for indicating a handover to the first cell.

In an embodiment, the handover may be initiated before an expiry of a T304 timer. The T304 timer may be started by a radio resource control (RRC) reconfiguration message for indicating a handover to the first cell.

In an embodiment, the obtaining of the measurement reports may comprise receiving, from each base station, a report message including a UE identifier (ID) indicating a specific UE and a measurement report corresponding to the UE ID. The measurement report may include a cell ID for indicating a specific cell, and a measurement result for the specific cell. The measurement result for the specific cell may include at least one of a reference signal received power (RSRP), a reference signal received quality (RSRQ), or a signal-to-noise ratio (SINR).

In an embodiment, the report message may further include usage information corresponding to the UE ID. The usage information may include at least one of information regarding a number of resource blocks (RBs), a modulation and coding scheme (MCS), or a channel quality indicator (CQI). The candidate cells of the UE may be identified based on the usage information.

In an embodiment, the report message may further include service information corresponding to the UE ID. The service information may include at least one of a single network slice selection assistance information (S-NSSAI), a protocol data unit (PDU) session, a data radio bearer (DRB), or a quality of service (QoS) flow. The candidate cells of the UE may be identified based on the service information.

In an embodiment, the method may further comprise transmitting, to the serving base station, configuration information regarding a pre-detection condition of call drop. The configuration information may be used to configure the serving base station to perform a handover to a target cell of a measurement report of the UE, in case that the pre-detection condition is satisfied.

In an embodiment, the control message may indicate that at least one cell among the candidate cells of the UE is used for a dual-active protocol stack (DAPS) handover.

In an embodiment, the measurement reports of the plurality of UEs may be obtained from report messages received during a designated interval. The designated interval may be configured to be smaller than a length of a T304 timer related to a handover failure.

In an embodiment, the candidate cells of the UE may be identified based on a neural network for a machine learning (ML). The neural network may be identified based on location information for the at least one base station and statistical information for each cell of the at least one base station.

According to embodiments, a method performed by a base station may comprise receiving at least one measurement report from at least one user equipment (UE). Each measurement report of the at least one measurement report may include a measurement result per cell of a corresponding UE. The method may comprise transmitting, to a radio access network (RAN) controller, a report message including the at least one measurement report. The method may comprise receiving, from the RAN controller, a control message including identification information for indicating a UE and identification information for indicating candidate cells of the UE. The method may comprise transmitting, to the UE, a handover command. The control message may indicate a handover priority of each cell of the candidate cells. The candidate cells include a first cell for access and a second cell for access to be performed in response to a failure of the access to the first cell. In other words, the candidate cells may include a first cell and a second cell for handover initiated in response to a connection failure to the first cell.

In an embodiment, the handover may be performed without cell reselection after the connection failure to the first cell. In other words, the handover is performed after the failure of the access while maintaining a radio resource control (RRC) connection state.

In an embodiment, the access to the second cell is initiated before an expiry of a timer for a radio resource control (RRC) re-establishment. The timer is started by a RRC reconfiguration message for indicating a handover to the first cell.

In an embodiment, the handover may be initiated before an expiry of a T304 timer. The T304 timer may be started by a radio resource control (RRC) reconfiguration message for indicating a handover to the first cell.

In an embodiment, the report message may include a UE identifier (ID) indicating a specific UE and a measurement report corresponding to the UE ID. The measurement report may include a cell ID for indicating a specific cell and a measurement result for the specific cell. The measurement result for the specific cell may include at least one of a reference signal received power (RSRP), a reference signal received quality (RSRQ), or a signal-to-noise ratio (SINR).

In an embodiment, the report message may further include usage information corresponding to the UE ID. The usage information may include at least one of information regarding a number of resource blocks (RBs), a modulation and coding scheme (MCS), or a channel quality indicator (CQI). The candidate cells of the UE may be identified based on the usage information.

In an embodiment, the report message may further include service information corresponding to the UE ID. The service information may include at least one of a single network slice selection assistance information (S-NSSAI), a protocol data unit (PDU) session, a data radio bearer (DRB), or a quality of service (QoS) flow. The candidate cells of the UE may be identified based on the service information.

In an embodiment, the handover command may comprise information on the first cell and information on the second cell.

In an embodiment, the method may further comprise receiving, from the RAN controller, configuration information regarding a pre-detection condition of call drop. The method may further comprise transmitting, in case that the pre-detection condition is satisfied, to the UE, a radio resource control (RRC) reconfiguration message for indicating a handover to a target cell. The target cell may be indicated based on a measurement report of the UE.

According to embodiments, a radio access network (RAN) controller connected to base stations may comprise at least one transceiver and at least one processor operably coupled to the at least one transceiver. The at least one processor may be configured to obtain measurement reports of a plurality of user equipment (UE)s. Each measurement report of the measurement reports may include a measurement result per cell of a corresponding UE. The at least one processor may be configured to identify candidate cells of a UE among the plurality of UEs, based on the measurement reports. The at least one processor may be configured to transmit, to a serving base station for the UE, a control message including identification information for indicating the UE and identification information for indicating the candidate cells of the UE. The control message may indicate a handover priority of each cell of the candidate cells. The candidate cells include a first cell for access and a second cell for access to be performed in response to a failure of the access to the first cell. In other words, the candidate cells may include a first cell and a second cell for handover initiated in response to a connection failure to the first cell.

In an embodiment, the handover may be performed without cell reselection after the connection failure to the first cell. In other words, the handover is performed after the failure of the access while maintaining a radio resource control (RRC) connection state.

In an embodiment, the access to the second cell is initiated before an expiry of a timer for a radio resource control (RRC) re-establishment. The timer is started by a RRC reconfiguration message for indicating a handover to the first cell.

In an embodiment, the handover may be initiated before an expiry of a T304 timer. The T304 timer may be started by a radio resource control (RRC) reconfiguration message for indicating a handover to the first cell.

In an embodiment, in order to obtain the measurement reports, the at least one processor may be configured to receive, from each base station, a report message including a UE identifier (ID) indicating a specific UE and a measurement report corresponding to the UE ID. The measurement report may include a cell ID for indicating a specific cell, and a measurement result for the specific cell. The measurement result for the specific cell includes at least one of a reference signal received power (RSRP), a reference signal received quality (RSRQ), or a signal-to-noise ratio (SINR).

In an embodiment, the report message may further include usage information corresponding to the UE ID. The usage information may include at least one of information regarding a number of resource blocks (RBs), a modulation and coding scheme (MCS), or a channel quality indicator (CQI). The candidate cells of the UE are identified based on the usage information.

In an embodiment, the report message may further include service information corresponding to the UE ID. The service information may include at least one of a single network slice selection assistance information (S-NSSAI), a protocol data unit (PDU) session, a data radio bearer (DRB), or a quality of service (QoS) flow. The candidate cells of the UE may be identified based on the service information.

In an embodiment, the at least one processor may be further configured to transmit, to the serving base station, configuration information regarding a pre-detection condition of call drop. The configuration information may be used to configure the serving base station to perform a handover to a target cell of a measurement report of the UE, in case that the pre-detection condition is satisfied.

In an embodiment, the control message may indicate that at least one cell among the candidate cells of the UE is used for a dual-active protocol stack (DAPS) handover.

In another embodiment, the measurement reports of the plurality of UEs may be obtained from report messages received during a designated interval. The designated interval may be configured to be smaller than a length of a T304 timer related to a handover failure.

In an embodiment, the candidate cells of the UE may be identified based on a neural network for a machine learning (ML). The neural network may be identified based on location information for the at least one base station and statistical information for each cell of the at least one base station.

According to embodiments, a device of a base station may comprise at least one transceiver and at least one processor operably coupled to the at least one transceiver. The at least one processor may be configured to receive at least one measurement report from at least one user equipment (UE). Each measurement report of the at least one measurement report including a measurement result per cell of a corresponding UE. The at least one processor may be configured to transmit, to a radio access network (RAN) controller, a report message including the at least one measurement report. The at least one processor may be configured to receive, from the RAN controller, a control message including identification information for indicating a UE and identification information for indicating candidate cells of the UE. The at least one processor may be configured to transmit, to the UE, a handover command. The control message may indicate a handover priority of each cell of the candidate cells. The candidate cells include a first cell for access and a second cell for access to be performed in response to a failure of the access to the first cell. In other words, the candidate cells may include a first cell and a second cell for handover initiated in response to a connection failure to the first cell.

In an embodiment, the handover may be performed without cell reselection after the connection failure to the first cell. In other words, the handover is performed after the failure of the access while maintaining a radio resource control (RRC) connection state.

In an embodiment, the access to the second cell is initiated before an expiry of a timer for a radio resource control (RRC) re-establishment. The timer is started by a RRC reconfiguration message for indicating a handover to the first cell.

In an embodiment, the handover may be initiated before an expiry of a T304 timer. The T304 timer may be started by a radio resource control (RRC) reconfiguration message for indicating a handover to the first cell.

In an embodiment, the report message may include a UE identifier (ID) indicating a specific UE and a measurement report corresponding to the UE ID. The measurement report may include a cell ID for indicating a specific cell and a measurement result for the specific cell. The measurement result for the specific cell may include at least one of a reference signal received power (RSRP), a reference signal received quality (RSRQ), or a signal-to-noise ratio (SINR).

In an embodiment, the report message may further include usage information corresponding to the UE ID. The usage information may include at least one of information regarding a number of resource blocks (RBs), a modulation and coding scheme (MCS), or a channel quality indicator (CQI). The candidate cells of the UE may be identified based on the usage information.

In an embodiment, the report message may further include service information corresponding to the UE ID. The service information may include at least one of a single network slice selection assistance information (S-NSSAI), a protocol data unit (PDU) session, a data radio bearer (DRB), or a quality of service (QoS) flow. The candidate cells of the UE may be identified based on the service information.

In an embodiment, the handover command may comprise information on the first cell and information on the second cell.

In an embodiment, the at least one processor may further comprise receiving, from the RAN controller, configuration information regarding a pre-detection condition of call drop. The at least one processor may further comprise transmitting, in case that the pre-detection condition is satisfied, to the UE, a radio resource control (RRC) reconfiguration message for indicating a handover to a target cell. The target cell may be indicated based on a measurement report of the UE.

Based on the discussion as described above, the disclosure provides a device and a method for cell management in a radio access network (RAN).

The disclosure provides a device and a method for admission control in a radio access network.

The disclosure provides a device and a method for matching a cell suitable for a terminal in a radio access network.

The disclosure provides a device and a method for controlling handover for connection between a terminal and a cell in a radio access network.

A device and a method according to embodiments of the disclosure can stabilize network state and improve network throughput performance by matching a user equipment (UE) and a cell based on a measurement report of each UE.

The effects that can be obtained from the disclosure are not limited to those described above, and any other effects not mentioned herein will be clearly understood by those having ordinary knowledge in the art to which the disclosure belongs, from the following description.

Methods according to the embodiments described in the claims or specifications of the disclosure may be implemented in the form of hardware, software, or a combination of hardware and software.

When implemented in software, a computer readable storage medium storing one or more programs (software modules) may be provided. One or more programs stored in the computer readable storage medium are configured for execution by one or more processors in the electronic device. The one or more programs include instructions that cause the electronic device to execute methods according to embodiments described in the claims or specification of the disclosure.

These programs (software modules, software) may be stored in random access memory, non-volatile memory including flash memory, read only memory (ROM), electrically erasable programmable read only memory (EE-PROM), magnetic disc storage device, compact disc-ROM (CD-ROM), digital versatile discs (DVDs) or other form of optical storage, or magnetic cassette. Alternatively, it may be stored in a memory configured as a combination of some or all of them. In addition, a plurality of each configuration memory may be included.

In addition, the program may be stored in an attachable storage device that may be accessed through a communication network such as the Internet, an intranet, a local area network (LAN), a wide area network (WAN), or a storage area network (SAN), or a communication network configured with a combination thereof. Such a storage device may access a device performing an embodiment of the disclosure through an external port. In addition, a separate storage device on the communication network may access a device performing an embodiment of the disclosure.

In the specific embodiments of the disclosure described above, components included in the disclosure are expressed in singular or plural numbers according to the specific embodiments presented. However, singular or plural expressions are selected appropriately for the presented situation for convenience of explanation, the disclosure is not limited to singular or plural components, and even if it is a component expressed in plural, it may be configured with singular, or even if it is a component expressed in singular, it may be configured with plural.

Meanwhile, in the detailed descriptions of the disclosure, specific embodiments have been described, but it goes without saying that various modifications are possible without departing from the scope of the disclosure.

What is claimed is:

1. A method performed by a radio access network (RAN) controller connected to base stations, the method comprising:
   obtaining measurement reports of a plurality of user equipments (UEs), each measurement report of the measurement reports comprising a measurement result per cell of a corresponding UE;
   identifying candidate cells of a UE among the plurality of UEs, based on the measurement reports, wherein the candidate cells comprise a first cell for access and a second cell for access to be performed in response to a failure of the access to the first cell; and
   transmitting, to a serving base station for the UE, a control message comprising identification information for indicating the UE and identification information for indicating the candidate cells of the UE,
   wherein the control message indicates a handover priority of each cell of the candidate cells.

2. The method of claim 1, wherein the handover is performed after the connection failure to the first cell while maintaining a radio resource control (RRC) connection state.

3. The method of claim 1,
   wherein the access to the second cell is initiated before an expiry of a timer for a radio resource control (RRC) re-establishment, and
   wherein the timer is started by a RRC reconfiguration message for indicating a handover to the first cell.

4. The method of claim 1, wherein the obtaining of the measurement reports comprises:
   receiving, from each base station, a report message comprising a UE identifier (ID) indicating a specific UE and a measurement report corresponding to the UE ID,
   wherein the measurement report comprises a cell ID for indicating a specific cell, and a measurement result for the specific cell, and
   wherein the measurement result for the specific cell comprises at least one of:
      a reference signal received power (RSRP),
      a reference signal received quality (RSRQ), or
      a signal-to-noise ratio (SINR).

5. The method of claim 1, further comprising:
   transmitting, to the serving base station, configuration information regarding a pre-detection condition of call drop,
   wherein the configuration information is used to configure the serving base station to perform a handover to a target cell of a measurement report of the UE, in case that the pre-detection condition is satisfied.

6. The method of claim 1, wherein the control message indicates that at least one cell among the candidate cells of the UE is used for a dual-active protocol stack (DAPS) handover.

7. The method of claim 1,
   wherein the measurement reports of the plurality of UEs are obtained from report messages received during a designated interval, and
   wherein the designated interval is configured to be smaller than a length of a T304 timer related to a handover failure.

8. A radio access network (RAN) controller connected to base stations, the RAN controller comprising:
   at least one transceiver; and
   at least one processor operably coupled to the at least one transceiver and configured to:
      obtain measurement reports of a plurality of user equipments (UEs), each measurement report of the measurement reports comprising a measurement result per cell of a corresponding UE,
      identify candidate cells of a UE among the plurality of UEs, based on the measurement reports, wherein the candidate cells comprise a first cell for access and a second cell for access to be performed in response to a failure of the access to the first cell, and
      transmit, to a serving base station for the UE, a control message comprising identification information for indicating the UE and identification information for indicating the candidate cells of the UE,
   wherein the control message indicates a handover priority of each cell of the candidate cells.

9. The RAN controller of claim 8, wherein the handover is performed after the connection failure to the first cell while maintaining a radio resource control (RRC) connection state.

10. The RAN controller of claim 8,
    wherein the access to the second cell is initiated before an expiry of a timer for a radio resource control (RRC) re-establishment, and
    wherein a T304 timer is started by a RRC reconfiguration message for indicating a handover to the first cell.

11. The RAN controller of claim 8, wherein the at least one processor is, to obtain the measurement reports, configured to:
    receive, from each base station, a report message comprising a UE identifier (ID) indicating a specific UE and a measurement report corresponding to the UE ID,
    wherein the measurement report comprises a cell ID for indicating a specific cell, and a measurement result for the specific cell, and
    wherein the measurement result for the specific cell comprises at least one of:
       a reference signal received power (RSRP),
       a reference signal received quality (RSRQ), or
       a signal-to-noise ratio (SINR).

12. The RAN controller of claim 8,
wherein the at least one processor is further configured to transmit, to the serving base station, configuration information regarding a pre-detection condition of call drop, and
wherein the configuration information is used to configure the serving base station to perform a handover to a target cell of a measurement report of the UE, in case that the pre-detection condition is satisfied.

13. The RAN controller of claim 8, wherein the control message indicates that at least one cell among the candidate cells of the UE is used for a dual-active protocol stack (DAPS) handover.

14. The RAN controller of claim 8,
wherein the measurement reports of the plurality of UEs are obtained from report messages received during a designated interval, and
wherein the designated interval is configured to be smaller than a length of a T304 timer related to a handover failure.

15. A device of a base station, the device comprising:
at least one transceiver; and
at least one processor operably coupled to the at least one transceiver and configured to:
receive at least one measurement report from at least one user equipment (UE), each measurement report of the at least one measurement report comprising a measurement result per cell of a corresponding UE,
transmit, to a radio access network (RAN) controller, a report message comprising the at least one measurement report,
receive, from the RAN controller, a control message comprising identification information for indicating a UE and identification information for indicating candidate cells of the UE, and
transmit, to the UE, a handover command,
wherein the control message indicates a handover priority of each cell of the candidate cells, and
wherein the candidate cells comprise a first cell for access and a second cell for access to be performed in response to a failure of the first access to the first cell.

16. The device of claim 15, wherein the handover is performed after the connection failure to the first cell while maintaining a radio resource control (RRC) connection state.

17. The device of claim 15,
wherein the handover is initiated before an expiry of a timer for a radio resource control (RRC) re-establishment, and
wherein a T304 timer is started by a RRC reconfiguration message for indicating a handover to the first cell.

18. The device of claim 15,
wherein the report message comprises a UE identifier (ID) indicating a specific UE and a measurement report corresponding to the UE ID,
wherein the measurement report comprises a cell ID for indicating a specific cell and a measurement result for the specific cell, and
wherein the measurement result for the specific cell comprises at least one of:
a reference signal received power (RSRP),
a reference signal received quality (RSRQ), or
a signal-to-noise ratio (SINR).

19. The device of claim 15,
wherein the handover command comprises information on the first cell and information on the second cell.

20. The device of claim 15,
wherein the at least one processor is further configured to:
receive, from the RAN controller, configuration information regarding a pre-detection condition of call drop; and
in case that the pre-detection condition is satisfied, transmit, to the UE, a radio resource control (RRC) reconfiguration message for indicating a handover to a target cell, and
wherein the target cell is indicated based on a measurement report of the UE.

* * * * *